(12) United States Patent
Suzuki et al.

(10) Patent No.: US 10,112,458 B2
(45) Date of Patent: *Oct. 30, 2018

(54) VEHICLE AIR-CONDITIONING DEVICE

(71) Applicant: Sanden Holdings Corporation, Isesaki-shi, Gunma (JP)

(72) Inventors: Kenichi Suzuki, Isesaki (JP); Megumi Shigeta, Isesaki (JP)

(73) Assignee: Sanden Holdings Corporation, Isesaki-shi, Gunma (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/703,348

(22) Filed: Sep. 13, 2017

(65) Prior Publication Data

US 2018/0022190 A1 Jan. 25, 2018

Related U.S. Application Data

(62) Division of application No. 14/647,741, filed as application No. PCT/JP2013/082159 on Nov. 29, 2013.

(30) Foreign Application Priority Data

Nov. 30, 2012 (JP) .................................. 2012-262387
Nov. 30, 2012 (JP) .................................. 2012-262396

(51) Int. Cl.
*B60H 1/32* (2006.01)
*F25B 6/04* (2006.01)
(Continued)

(52) U.S. Cl.
CPC ....... *B60H 1/3205* (2013.01); *B60H 1/00899* (2013.01); *F25B 1/10* (2013.01);
(Continued)

(58) Field of Classification Search
CPC ... B60H 1/00899; B60H 1/3205; F25B 40/00; F25B 40/04; F25B 6/04
See application file for complete search history.

(56) References Cited

U.S. PATENT DOCUMENTS 4,833,893 A 5/1989 Morita
6,237,351 B1 5/2001 Itoh et al.
(Continued)

FOREIGN PATENT DOCUMENTS

DE 600 31 808 T2 9/2007
EP 0 989 003 A2 3/2000
(Continued)

OTHER PUBLICATIONS

Japan Patent Office, International Search Report issued in Application No. PCT/JP2013/082159, dated Feb. 4, 2014.
(Continued)

*Primary Examiner* — Kun Kai Ma
(74) *Attorney, Agent, or Firm* — Baker Botts L.L.P.

(57) ABSTRACT

There is disclosed a vehicle air-conditioning device in which a heating qualification by gas injection can sufficiently be obtained. The vehicle air-conditioning device comprises a compressor 2 which compresses a refrigerant, an air flow passage 3 through which air to be supplied into a vehicle interior flows, a radiator 4 disposed in the air flow passage to let the refrigerant radiate heat, a heat absorber 9 disposed in the air flow passage to let the refrigerant absorb heat, an outdoor heat exchanger 7 disposed outside the vehicle interior to let the refrigerant radiate or absorb heat, and a controller. The controller executes a heating mode in which the refrigerant discharged from the compressor 2 radiates heat in the radiator 4 and the refrigerant by which heat has been radiated is decompressed and then absorbs heat in the outdoor heat exchanger 7. The vehicle air-conditioning device comprises an injection circuit 40 which distributes a (Continued)

part of the refrigerant flowing out from the radiator 4 to return the refrigerant to the middle of compression by the compressor 2, and the injection circuit 40 has an expansion valve 30, and a discharge side heat exchanger 35 which performs heat exchange between the refrigerant decompressed by the expansion valve 30 and the refrigerant discharged from the compressor 2 before flowing into the radiator 4.

6 Claims, 24 Drawing Sheets

(51) Int. Cl.
*F25B 1/10* (2006.01)
*B60H 1/00* (2006.01)
*F25B 40/00* (2006.01)
*F25B 5/02* (2006.01)
*F25B 40/04* (2006.01)

(52) U.S. Cl.
CPC ............... *F25B 5/02* (2013.01); *F25B 6/04* (2013.01); *F25B 40/00* (2013.01); *F25B 40/04* (2013.01); *F25B 2400/0403* (2013.01); *F25B 2400/0409* (2013.01); *F25B 2400/0411* (2013.01)

(56) References Cited

U.S. PATENT DOCUMENTS

| | | | | |
|---|---|---|---|---|
| 6,293,123 | B1* | 9/2001 | Iritani | B60H 1/3205 62/197 |
| 2013/0000340 | A1* | 1/2013 | Takayama | F25B 9/008 62/222 |
| 2014/0053587 | A1* | 2/2014 | Arii | F25B 41/043 62/196.1 |
| 2014/0116673 | A1* | 5/2014 | Kang | B60H 1/004 165/222 |
| 2014/0208775 | A1* | 7/2014 | Styles | F25B 30/02 62/56 |
| 2015/0151609 | A1* | 6/2015 | Satou | B60H 1/3204 165/63 |
| 2016/0297283 | A1* | 10/2016 | Sakamoto | F25B 47/02 |

FOREIGN PATENT DOCUMENTS

| | | | |
|---|---|---|---|
| EP | 1 072 453 B1 | 7/2000 | |
| EP | 1072453 B1 * | 11/2006 | ......... B60H 1/00357 |
| JP | 63-021448 A | 1/1988 | |
| JP | 08-282263 A | 10/1996 | |
| JP | 2002-005532 A | 1/2002 | |
| JP | 2006-258343 A | 9/2006 | |
| JP | 2007-247932 A | 9/2007 | |
| JP | 3985384 B2 | 10/2007 | |
| JP | 2008-286476 A | 11/2008 | |
| JP | 2012-176660 A | 9/2012 | |

OTHER PUBLICATIONS

The State Intellectual Property Office of the People's Republic of China, The Second Office Action issued in Chinese Patent Application No. 201380062691.1, dated Feb. 4, 2017.
The State Intellectual Property Office of the People's Republic of China, The First Office Action issued in Chinese Patent Application No. 201380062691.1, dated Jun. 3, 2016.
German Patent and Trade Mark Office, Office Action issued in German Application No. DE 11 2013 005 737.9, dated Nov. 16, 2016.
Japan Patent Office, Notification of Reasons for Refusal issued in Japanese Patent Application No. 2012-262396, dated Jun. 28, 2016.
Japan Patent Office, Notification of Reasons for Refusal issued in Japanese Patent Application No. 2012-262387, dated Jun. 29, 2016.

* cited by examiner

VEHICLE AIR-CONDITIONING DEVICE

CROSS-REFERENCE TO RELATED APPLICATIONS

This application is a Divisional of U.S. patent application Ser. No. 14/647,741, filed on May 27, 2015, which is a U.S. National Stage Patent Application under 35 U.S.C. § 371 of International Patent Application No. PCT/JP2013/082159, filed on Nov. 29, 2013, which claims the benefit of Japanese Patent Application Nos. JP 2012-262387 and JP 2012-262396, filed on Nov. 30, 2012, the disclosures of each of which are incorporated herein by reference in their entirety.

TECHNICAL FIELD

The present invention relates to an air-conditioning device of a heat pump system which conditions air in a vehicle interior, and more particularly, it relates to an air-conditioning device applicable to a hybrid car or an electric car.

BACKGROUND ART

Due to actualization of environmental problems in recent years, hybrid cars and electric cars have spread. Furthermore, as an air-conditioning device which is applicable to such a vehicle, there has been developed an air-conditioning device which comprises a compressor to compress and discharge a refrigerant, a radiator (a condenser) disposed on a vehicle interior side to let the refrigerant radiate heat, a heat absorber (an evaporator) disposed on the vehicle interior side to let the refrigerant absorb heat, and an outdoor heat exchanger disposed outside the vehicle interior to let the refrigerant radiate or absorb heat, and which changes and executes respective modes, i.e., a heating mode in which the refrigerant discharged from the compressor radiates heat in the radiator and the refrigerant by which heat has been radiated in this radiator absorbs heat in the outdoor heat exchanger, a dehumidifying mode in which the refrigerant discharged from the compressor radiates heat in the radiator and the refrigerant by which heat has been radiated in the radiator absorbs heat in the heat absorber, and a cooling mode in which the refrigerant discharged from the compressor radiates heat in the outdoor heat exchanger and absorbs heat in the heat absorber (e.g., see Patent Document 1).

Additionally, in Patent Document 1, there is disposed an injection circuit which distributes the refrigerant flowing out from the radiator, decompresses this distributed refrigerant, and then performs heat exchange between the decompressed refrigerant and the refrigerant flowing out from the radiator to return the refrigerant to the middle of compression by the compressor, thereby increasing an amount of the refrigerant to be discharged from the compressor and improving a heating qualification by the radiator.

In addition, there has also been developed an air-conditioning device which executes respective operation modes of a heating operation in which a refrigerant discharged from a compressor radiates heat in a radiator and the refrigerant by which heat has been radiated in this radiator absorbs heat in an outdoor heat exchanger, a dehumidifying and heating operation in which the refrigerant discharged from the compressor radiates heat in the radiator and the refrigerant by which heat has been radiated in the radiator absorbs heat only in a heat absorber or in this heat absorber and the outdoor heat exchanger, a cooling operation in which the refrigerant discharged from the compressor radiates heat in the outdoor heat exchanger and absorbs heat in the heat absorber, and a dehumidifying and cooling operation in which the refrigerant discharged from the compressor radiates heat in the radiator and the outdoor heat exchanger and absorbs heat in the heat absorber (e.g., see Patent Document 2).

CITATION LIST

Patent Documents

Patent Document 1: Japanese Patent No. 3985384
Patent Document 2: Japanese Patent Application Publication No. 2012-176660

SUMMARY OF THE INVENTION

Problems to be Solved by the Invention

However, a temperature of a refrigerant flowing out from a radiator is low, and hence a heat exchange amount between the refrigerant and a distributed and decompressed refrigerant becomes smaller. Therefore, to inject a gas to a middle of compression process by a compressor, there is a limit to increase of an amount of the refrigerant allowed to flow through an injection circuit, and the discharged refrigerant of the compressor cannot sufficiently be increased, thereby causing the problem that a required heating qualification cannot be obtained.

Additionally, in a heating operation, an outdoor heat exchanger absorbs heat from outdoor air, and hence frost is formed in the outdoor heat exchanger. When the frost formed in the outdoor heat exchanger grows, a heat absorption qualification from the outdoor air noticeably deteriorates, and hence a defrost operation to remove the frost formed in the outdoor heat exchanger is executed. However, a temperature of air blown out into a vehicle interior lowers during this defrost operation, comfort is impaired, and power consumption also increases, so that there is also the demand that the defrosting is to be minimized.

The present invention has been developed to solve such conventional technical problems, and an object thereof is to provide a vehicle air-conditioning device in which a heating qualification by gas injection can sufficiently be obtained.

Another object of the present invention is to provide a vehicle air-conditioning device in which frost formation to an outdoor heat exchanger is suppressed by using an injection circuit which performs gas injection to a compressor.

Means for Solving the Problems

A vehicle air-conditioning device of an embodiment comprises a compressor which compresses a refrigerant, an air flow passage through which air to be supplied into a vehicle interior flows, a radiator disposed in this air flow passage to let the refrigerant radiate heat, a heat absorber disposed in the air flow passage to let the refrigerant absorb heat, an outdoor heat exchanger disposed outside the vehicle interior to let the refrigerant radiate or absorb heat, and control means, at least this control means being configured to execute a heating mode in which the refrigerant discharged from the compressor radiates heat in the radiator and the refrigerant by which heat has been radiated is decompressed and then absorbs heat in the outdoor heat exchanger, the vehicle air-conditioning device being characterized by comprising an injection circuit which distributes a part of the refrigerant flowing out from the radiator to return the refrigerant to the middle of compression by the compressor, and characterized in that this injection circuit has pressure reducing means, and a discharge side heat exchanger which performs heat exchange between the refrigerant decompressed by this pressure reducing means and the refrigerant discharged from the compressor before flowing into the radiator.

A vehicle air-conditioning device of an embodiment comprises a compressor which compresses a refrigerant, an air flow passage through which air to be supplied into a vehicle interior flows, a radiator disposed in this air flow passage to let the refrigerant radiate heat, a heat absorber disposed in the air flow passage to let the refrigerant absorb heat, an outdoor heat exchanger disposed outside the vehicle interior to let the refrigerant radiate or absorb heat, and control means, at least this control means being configured to execute a heating mode in which the refrigerant discharged from the compressor radiates heat in the radiator and the refrigerant by which heat has been radiated is decompressed and then absorbs heat in the outdoor heat exchanger, the vehicle air-conditioning device being characterized by comprising an injection circuit which distributes a part of the refrigerant flowing out from the radiator to return the refrigerant to the middle of compression by the compressor, and a water circulation circuit in which water heated by heating means is circulated by circulating means, and characterized in that the injection circuit has pressure reducing means, and a water-refrigerant heat exchanger which performs heat exchange between the refrigerant decompressed by this pressure reducing means and the water flowing in the water circulation circuit.

The vehicle air-conditioning device of an embodiment is characterized in that in the above invention, the water circulation circuit has a water-air heat exchanger disposed on an air inflow side of the outdoor heat exchanger or in the air flow passage.

The vehicle air-conditioning device of an embodiment is characterized in that in the above respective inventions, the injection circuit further has a radiator outlet side heat exchanger which performs heat exchange between the refrigerant decompressed by the pressure reducing means or another pressure reducing means that is separately disposed and the refrigerant flowing out from the radiator.

The vehicle air-conditioning device of an embodiment is characterized in that in the above invention, the injection circuit further has flow path control means for controlling flow of the refrigerant to the respective heat exchangers in the injection circuit, and the control means usually evaporates the refrigerant decompressed by the pressure reducing means in the radiator outlet side heat exchanger by the flow path control means, and evaporates the refrigerant in the discharge side heat exchanger or the water-refrigerant heat exchanger and increases a refrigerant flow rate in the injection circuit by the pressure reducing means when the heat radiation of the radiator runs short.

The vehicle air-conditioning device of an embodiment is characterized in that in the above respective inventions, the control means compares a demand heating qualification Qtgt which is a demanded radiator heating qualification with a heating qualification Qhp generated by the radiator, and allows the refrigerant to flow through the injection circuit by the pressure reducing means when the heating qualification Qhp is lower than the demand heating qualification Qtgt.

The vehicle air-conditioning device of an embodiment is characterized in that in the above invention, the control means calculates the demand heating qualification Qtgt on the basis of one of indexes indicating a temperature of the air flowing into the radiator, a temperature of the air flowing out from this radiator, and a volume of the air passing this radiator, or any combination of these indexes, and indexes indicating specific heat of the air flowing into the radiator and a density of this air, and the control means calculates the heating qualification Qhp on the basis of one of indexes indicating an outdoor temperature, the refrigerant flow rate, an air volume in the air flow passage, a velocity, a temperature of the heat absorber, a revolution number of the compressor, a refrigerant pressure of an outlet of the radiator, a refrigerant temperature of the radiator outlet, a refrigerant pressure of an inlet of the radiator, and a refrigerant temperature of the radiator inlet or any combination of these indexes.

The vehicle air-conditioning device of an embodiment is characterized in that in the inventions of claim 1 to claim 5, the control means allows the refrigerant to flow through the injection circuit by the pressure reducing means on the basis of an environmental condition judged from one of indexes indicating the outdoor temperature, the air volume in the air flow passage, a difference between a target radiator temperature and an actual radiator temperature, a discharge refrigerant temperature of the compressor, and a discharge refrigerant pressure of the compressor, or any combination of these indexes, when the environmental condition in the heating mode worsens.

The vehicle air-conditioning device of an embodiment is characterized in that the control means controls an amount of the refrigerant to be returned from the injection circuit to the compressor by the pressure reducing means, on the basis of one of a difference between the demand heating qualification Qtgt which is the demanded radiator heating qualification and the heating qualification Qhp generated by the radiator, a difference between the target radiator temperature and a temperature of the radiator, a difference between a target radiator pressure and a pressure of the radiator, and a target outlet temperature to the vehicle interior, or any combination thereof.

The vehicle air-conditioning device of an embodiment is characterized in that the vehicle air-conditioning device comprises a water circulation circuit in which water heated by heating means is circulated by circulating means, this water circulation circuit has a water-air heat exchanger disposed in the air flow passage, and the control means circulates the water heated by the heating means in the water-air heat exchanger, when the heating qualification of the radiator is not satisfied even by allowing the refrigerant to flow through the injection circuit.

A vehicle air-conditioning device of an embodiment comprises a compressor which compresses a refrigerant, an air flow passage through which air to be supplied into a vehicle interior flows, a radiator disposed in this air flow passage to let the refrigerant radiate heat, a heat absorber disposed in the air flow passage to let the refrigerant absorb heat, an outdoor heat exchanger disposed outside the vehicle interior to let the refrigerant radiate or absorb heat, and control means, at least this control means being configured to execute a heating mode in which the refrigerant discharged from the compressor radiates heat in the radiator and the refrigerant by which heat has been radiated is decompressed and then absorbs heat in the outdoor heat exchanger, the vehicle air-conditioning device being characterized by comprising an injection circuit which distributes a part of the refrigerant flowing out from the radiator to return the refrigerant to the middle of compression by the compressor, and characterized in that the control means has frost formation condition estimating means for estimating a frost formation condition to the outdoor heat exchanger, and operates the injection circuit and returns the refrigerant to the middle of compression by the compressor, when frost formation to the outdoor heat exchanger is predicted on the basis of the estimation of this frost formation condition estimating means.

The vehicle air-conditioning device of an embodiment is characterized in that in the above invention, the frost formation condition estimating means estimates the frost formation condition to the outdoor heat exchanger on the basis of one of indexes indicating an outdoor temperature, an outdoor humidity, a refrigerant evaporation pressure of the outdoor heat exchanger, and a refrigerant evaporation temperature of the outdoor heat exchanger, or any combination of these indexes.

The vehicle air-conditioning device of an embodiment is characterized in that the control means compares a demand heating qualification Qtgt which is a demanded radiator heating qualification with a heating qualification Qhp generated by the radiator, and controls an injection amount by the injection circuit.

The vehicle air-conditioning device of an embodiment is characterized in that in the above invention, the vehicle air-conditioning device comprises a water circulation circuit in which water heated by heating means is circulated by circulating means, this water circulation circuit has a water-air heat exchanger disposed in the air flow passage, and the water circulation circuit is operated when the heating qualification Qhp of the radiator is insufficient.

The vehicle air-conditioning device of an embodiment is characterized in that the control means executes an operation to suppress the frost formation to the outdoor heat exchanger on the basis of the estimation of the frost formation condition estimating means in a stage before the injection circuit is operated.

Advantageous Effect of the Invention

According to an embodiment in a vehicle air-conditioning device comprising a compressor which compresses a refrigerant; an air flow passage through which air to be supplied into a vehicle interior flows; a radiator disposed in this air flow passage to let the refrigerant radiate heat; a heat absorber disposed in the air flow passage to let the refrigerant absorb heat; an outdoor heat exchanger disposed outside the vehicle interior to let the refrigerant radiate or absorb heat; and control means, at least this control means is configured to execute a heating mode in which the refrigerant discharged from the compressor radiates heat in the radiator and the refrigerant by which heat has been radiated is decompressed and then absorbs heat in the outdoor heat exchanger. In the vehicle air-conditioning device, there is disposed an injection circuit which distributes a part of the refrigerant flowing out from the radiator to return the refrigerant to the middle of compression by the compressor, and in this injection circuit, there are disposed pressure reducing means, and a discharge side heat exchanger which performs heat exchange between the refrigerant decompressed by the pressure reducing means and the refrigerant discharged from the compressor before flowing into the radiator, or a water-refrigerant heat exchanger which performs heat exchange between the refrigerant decompressed by this pressure reducing means and the heated water flowing in the water circulation circuit. Therefore, the refrigerant returned to the middle of compression by the compressor via the injection circuit is subjected to the heat exchange with the discharged refrigerant of the compressor which has a higher temperature than the refrigerant flowing out from the radiator, or with the water in the water circulation circuit, so that the refrigerant can be evaporated.

In consequence, a gas injection amount to the compressor can sufficiently be acquired, and an amount of the refrigerant to be discharged from the compressor is increased, so that a heating qualification can improve.

In this case, as in an embodiment, when the water circulation circuit has a water-air heat exchanger disposed on an air inflow side of the outdoor heat exchanger or in the air flow passage, frost formation to the outdoor heat exchanger can be suppressed or heating in the vehicle interior can be complemented by the heated water flowing in the water circulation circuit.

Additionally, as in an embodiment, when in the injection circuit, there is further disposed a radiator outlet side heat exchanger which performs heat exchange between the refrigerant decompressed by the pressure reducing means or another pressure reducing means that is separately disposed and the refrigerant flowing out from the radiator, the refrigerant returned to the middle of compression by the compressor can be evaporated also by the heat exchange between the refrigerant and the refrigerant flowing out from the radiator.

In this case, as in an embodiment, in the injection circuit, there is further disposed flow path control means for controlling flow of the refrigerant to the respective heat exchangers in the injection circuit, and the control means usually evaporates the refrigerant decompressed by the pressure reducing means in the radiator outlet side heat exchanger by the flow path control means, and evaporates the refrigerant in the discharge side heat exchanger or the water-refrigerant heat exchanger and increases a refrigerant flow rate in the injection circuit by the pressure reducing means when the heat radiation of the radiator runs short. Consequently, only when the heating qualification is insufficient, the discharged refrigerant of the compressor or the heated water in the water circulation circuit can be utilized.

In consequence, it is possible to eliminate the disadvantage that enthalpy of the refrigerant flowing into the radiator is unnecessarily lowered for gas injection, and it is possible to improve an operation efficiency while improving the heating qualification.

Additionally, as in an embodiment, the control means compares a demand heating qualification Qtgt which is a demanded radiator heating qualification with a heating qualification Qhp generated by the radiator, and allows the refrigerant to flow through the injection circuit by the pressure reducing means when the heating qualification Qhp is lower than the demand heating qualification Qtgt. In this case, it is possible to suitably control the gas injection to the compressor, it is possible to inhibit deterioration of an efficiency in a case where the refrigerant flowing through the injection circuit is evaporated by the discharged refrigerant of the compressor, and it is possible to efficiently realize the improvement of the heating qualification by the gas injection.

In this case, as in an embodiment, the control means calculates the demand heating qualification Qtgt on the basis of one of indexes indicating a temperature of the air flowing into the radiator, a temperature of the air flowing out from this radiator, and a volume of the air passing this radiator, or any combination of these indexes, and indexes indicating specific heat of the air flowing into the radiator and a density of this air, and the control means calculates the heating qualification Qhp on the basis of one of indexes indicating an outdoor temperature, the refrigerant flow rate, an air volume in the air flow passage, a vehicle velocity, a temperature of the heat absorber, a revolution number of the compressor, a refrigerant pressure of a radiator outlet, a refrigerant temperature of the radiator outlet, a refrigerant pressure of a radiator inlet, and a refrigerant temperature of the radiator inlet or any combination of these indexes, so that it is possible to more accurately control the gas injection to the compressor.

Additionally, as in an embodiment, the control means allows the refrigerant to flow through the injection circuit by the pressure reducing means on the basis of an environmental condition judged from one of indexes indicating the outdoor temperature, the air volume in the air flow passage, a difference between a target radiator temperature and an actual radiator temperature, a discharge refrigerant temperature of the compressor, and a discharge refrigerant pressure of the compressor, or any combination of these indexes, when the environmental condition in the heating mode worsens, so that it is also possible to accurately control the gas injection to the compressor.

Furthermore, as in an embodiment, the control means controls an amount of the refrigerant to be returned from the injection circuit to the compressor by the pressure reducing means, on the basis of one of a difference between the demand heating qualification Qtgt which is the demanded radiator heating qualification and the heating qualification Qhp generated by the radiator, a difference between the target radiator temperature and a temperature of the radiator, a difference between a target radiator pressure and a pressure of the radiator, and a target outlet temperature to the vehicle interior, or any combination thereof, so that it is possible to also accurately regulate the amount of the refrigerant to be returned to the compressor by the gas injection.

Furthermore, as in an embodiment, there is disposed a water circulation circuit in which water heated by heating means is circulated by circulating means, this water circulation circuit has a water-air heat exchanger disposed in the air flow passage, and the control means circulates the water heated by the heating means in the water-air heat exchanger, when the heating qualification of the radiator is not satisfied even by allowing the refrigerant to flow through the injection circuit. In this case, when the heating qualification is not satisfied even by the gas injection of the injection circuit, this qualification can be complemented by the water circulation circuit, and comfortable interior heating can be realized.

According to an embodiment, the vehicle air-conditioning device comprises a compressor which compresses a refrigerant, an air flow passage through which air to be supplied into a vehicle interior flows, a radiator disposed in this air flow passage to let the refrigerant radiate heat, a heat absorber disposed in the air flow passage to let the refrigerant absorb heat, an outdoor heat exchanger disposed outside the vehicle interior to let the refrigerant radiate or absorb heat, and control means, at least this control means is configured to execute a heating mode in which the refrigerant discharged from the compressor radiates heat in the radiator and the refrigerant by which heat has been radiated is decompressed and then absorbs heat in the outdoor heat exchanger. The vehicle air-conditioning device comprises an injection circuit which distributes a part of the refrigerant flowing out from the radiator to return the refrigerant to the middle of compression by the compressor. The control means has frost formation condition estimating means for estimating a frost formation condition to the outdoor heat exchanger, and operates the injection circuit and returns the refrigerant to the middle of compression by the compressor, when frost formation to the outdoor heat exchanger is predicted on the basis of the estimation of this frost formation condition estimating means. Consequently, when the frost formation is predicted, the injection circuit performs the gas injection to the compressor, so that it is possible to suppress the frost formation to the outdoor heat exchanger. In consequence, it is possible to avoid deterioration of air condition in the vehicle interior due to defrosting and improve the heating qualification by the radiator.

In this case, as in an embodiment, the frost formation condition estimating means estimates the frost formation condition to the outdoor heat exchanger on the basis of one of indexes indicating an outdoor temperature, an outdoor humidity, a refrigerant evaporation pressure of the outdoor heat exchanger, and a refrigerant evaporation temperature of the outdoor heat exchanger, or any combination of these indexes, so that it is possible to accurately estimate the frost formation condition of the outdoor heat exchanger.

Additionally, as in an embodiment, the control means compares a demand heating qualification Qtgt which is a demanded radiator heating qualification with a heating qualification Qhp generated by the radiator, and controls an injection amount by the injection circuit, so that it is possible to accurately control an amount of the refrigerant to be subjected to the gas injection to the compressor.

In addition, as in an embodiment, there is disposed a water circulation circuit in which water heated by heating means is circulated by circulating means, this water circulation circuit has a water-air heat exchanger disposed in the air flow passage, and the water circulation circuit is operated when the heating qualification Qhp of the radiator is insufficient. In this case, when the heating qualification is not satisfied even by the gas injection, the heated water radiates heat in the water-air heat exchanger of the water circulation circuit, so that it is possible to complement the heating.

Furthermore, as in an embodiment, the control means executes an operation to suppress the frost formation to the outdoor heat exchanger on the basis of the estimation of the frost formation condition estimating means in a stage before the injection circuit is operated, so that the defrosting is avoided as much as possible, and worsening of the air condition in the vehicle interior can effectively be avoided.

MODE FOR CARRYING OUT THE INVENTION

Hereinafter, embodiments of the present invention will be described in detail with reference to the drawings.

Figure 1:
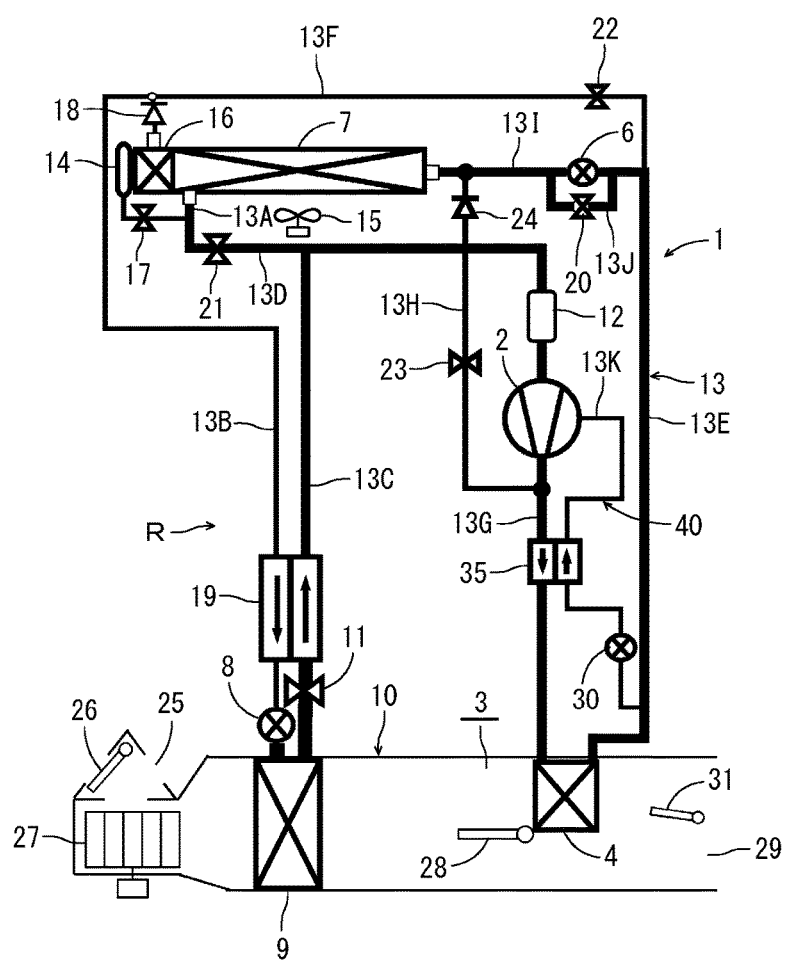
FIG. 1 is a constitutional view of a vehicle air-conditioning device of one embodiment to which the present invention is applied.

FIG. 1 shows a constitutional view of a vehicle air-conditioning device 1 of one embodiment of the present invention. In this case, a vehicle of the embodiment to which the present invention is applied is an electric car (EV) which does not have an engine (an internal combustion engine), and runs by driving an electric motor for running by a power charged in a battery (all are not shown), and the vehicle air-conditioning device 1 of the present invention is also driven by the power of the battery. That is, in the electric car in which heating cannot be performed by waste heat of the engine, the vehicle air-conditioning device 1 of the embodiment performs the heating by a heat pump operation in which a refrigerant circuit is used, and further selectively executes respective operation modes of dehumidifying and heating, cooling and dehumidifying, cooling, and the like.

It is to be noted that needless to say, the vehicle is not limited to the electric car, and the present invention is also effective for a so-called hybrid car in which the engine is used together with the electric motor for the running, and is further applicable also to a usual car which runs by the engine.

The vehicle air-conditioning device 1 of the embodiment performs air conditioning (heating, cooling, dehumidifying, and ventilation) of an interior of the electric car, and there are successively connected, by a refrigerant pipe 13, an electric compressor 2 which compresses a refrigerant, a radiator 4 disposed in an air flow passage 3 of an HVAC unit 10 in which interior air is passed and circulated, to let the high-temperature high-pressure refrigerant discharged from the compressor 2 radiate heat in the vehicle interior, an outdoor expansion valve 6 constituted of an electric valve which decompresses and expands the refrigerant during the heating, an outdoor heat exchanger 7 which performs heat exchange between the refrigerant and outdoor air to function as the radiator during the cooling and function as an evaporator during the heating, an indoor expansion valve 8 constituted of an electric valve which decompresses and expands the refrigerant, a heat absorber 9 disposed in the air flow passage 3 to let the refrigerant absorb heat from interior and exterior of the vehicle during the cooling and during the dehumidifying, an evaporation capability control valve 11 which regulates an evaporation capability in the heat absorber 9, an accumulator 12 and the like, so that a refrigerant circuit R is constituted. It is to be noted that in the outdoor heat exchanger 7, an outdoor blower 15 is disposed to perform the heat exchange between the outdoor air and the refrigerant.

In addition, the outdoor heat exchanger 7 has a receiver drier portion 14 and a subcooling portion 16 successively on a refrigerant downstream side, a refrigerant pipe 13A extended out from the outdoor heat exchanger 7 is connected to the receiver drier portion 14 via a solenoid valve (an opening/closing valve) 17 opened during the cooling, and an outlet of the subcooling portion 16 is connected to the indoor expansion valve 8 via a check valve 18. It is to be noted that the receiver drier portion 14 and the subcooling portion 16 structurally constitute a part of the outdoor heat exchanger 7, and an indoor expansion valve 8 side of the check valve 18 is a forward direction.

In addition, a refrigerant pipe 13B between the check valve 18 and the indoor expansion valve 8 is disposed in a heat exchange relation with a refrigerant pipe 13C extended out from the evaporation capability control valve 11 positioned on an outlet side of the heat absorber 9, and both the pipes constitute an internal heat exchanger 19. In consequence, the refrigerant flowing through the refrigerant pipe 13B into the indoor expansion valve 8 is cooled (subcooled) by the low-temperature refrigerant flowing out from the heat absorber 9 through the evaporation capability control valve 11.

In addition, the refrigerant pipe 13A extended out from the outdoor heat exchanger 7 is branched, and this branched refrigerant pipe 13D communicates to be connected to the refrigerant pipe 13C on the downstream side of the internal heat exchanger 19 via a solenoid valve (an opening/closing valve) 21 to be opened during the heating. Furthermore, a refrigerant pipe 13E on an outlet side of the radiator 4 is branched before the outdoor expansion valve 6, and this branched refrigerant pipe 13F communicates to be connected to the refrigerant pipe 13B on the downstream side of the check valve 18 via a solenoid valve (an opening/closing valve) 22 to be opened during the dehumidifying.

In addition, a bypass pipe 13J is connected to the outdoor expansion valve 6 in parallel therewith, and in the bypass pipe 13J, there is disposed a solenoid valve (an opening/closing valve) 20 which is opened in a cooling mode and allows the refrigerant to bypass the outdoor expansion valve 6 and flow through the bypass pipe. Furthermore, a refrigerant pipe 13G on a discharge side of the compressor 2 is branched, and this branched refrigerant pipe 13H communicates to be connected to a parallel circuit of the outdoor expansion valve 6 and the bypass pipe 13J and a bypass pipe 13I between the outdoor expansion valve and the outdoor heat exchanger 7 via a solenoid valve (an opening/closing valve) 23 which is opened in a defrost mode to perform the defrosting in the outdoor heat exchanger 7 to allow the high-temperature refrigerant (a hot gas) discharged from the compressor 2 to flow directly into the outdoor heat exchanger 7 and a check valve 24. The solenoid valve 23 constitutes defrosting means. It is to be noted that a direction of the refrigerant pipe 13I of the check valve 24 is the forward direction.

In addition, the refrigerant pipe 13E is branched immediately after the pipe is extended out from the radiator 4 (before the pipe is branched to the refrigerant pipes 13F and 13I), and this branched refrigerant pipe 13K communicates to be connected to the part of the compressor 2 in the middle of compression by the compressor 2 via an injection expansion valve 30 constituted of an electric valve for injection control. Furthermore, the refrigerant pipe 13K between an outlet side of the injection expansion valve 30 and the compressor 2 is disposed in a heat exchange relation with the refrigerant pipe 13G positioned on the discharge side of the compressor 2 (on a downstream side from a branch point from the refrigerant pipe 13H), and both the pipes constitute a discharge side heat exchanger 35.

The refrigerant pipe 13K, the injection expansion valve 30 and the discharge side heat exchanger 35 constitute an injection circuit 40 in the present invention. The injection circuit 40 is a circuit which distributes a part of the refrigerant flowing out from the radiator 4 to return the refrigerant to the middle of compression process by the compressor 2 (gas injection), and the injection expansion valve 30 decompresses the refrigerant flowing into the refrigerant pipe 13K and then allows the refrigerant to flow into the discharge side heat exchanger 35. The refrigerant flowing into the discharge side heat exchanger 35 is discharged from the compressor 2 to the refrigerant pipe 13G, performs heat exchange with the refrigerant which is to flow into the radiator 4, and absorbs heat from the refrigerant flowing through the refrigerant pipe 13G to evaporate. When the refrigerant distributed to the refrigerant pipe 13K evaporates in the discharge side heat exchanger 35, the gas injection to the compressor 2 is performed.

Additionally, in the air flow passage 3 on an air upstream side of the heat absorber 9, respective suction ports such as outdoor air suction port and an indoor air suction port (represented by a suction port 25 in FIG. 1) are formed, and in the suction port 25, a suction changing damper 26 is disposed to change the air to be introduced into the air flow passage 3 to indoor air which is air in the vehicle interior (an indoor air circulating mode) and outdoor air which is air outside the vehicle interior (an outdoor air introducing mode). Further, on an air downstream side of the suction changing damper 26, an indoor blower (a blower fan) 27 is disposed to supply the introduced indoor air or outdoor air to the air flow passage 3.

Additionally, in the air flow passage 3 on the air upstream side of the radiator 4, an air mix damper 28 is disposed to regulate a degree of flow of the indoor air or the outdoor air through the radiator 4. Further, in the air flow passage 3 on an air downstream side of the radiator 4, each outlet of foot, vent or defroster (represented by an outlet 29 in FIG. 1) is formed, and in the outlet 29, an outlet changing damper 31 is disposed to perform changing control of blowing of the air from each outlet mentioned above.

Figure 2:
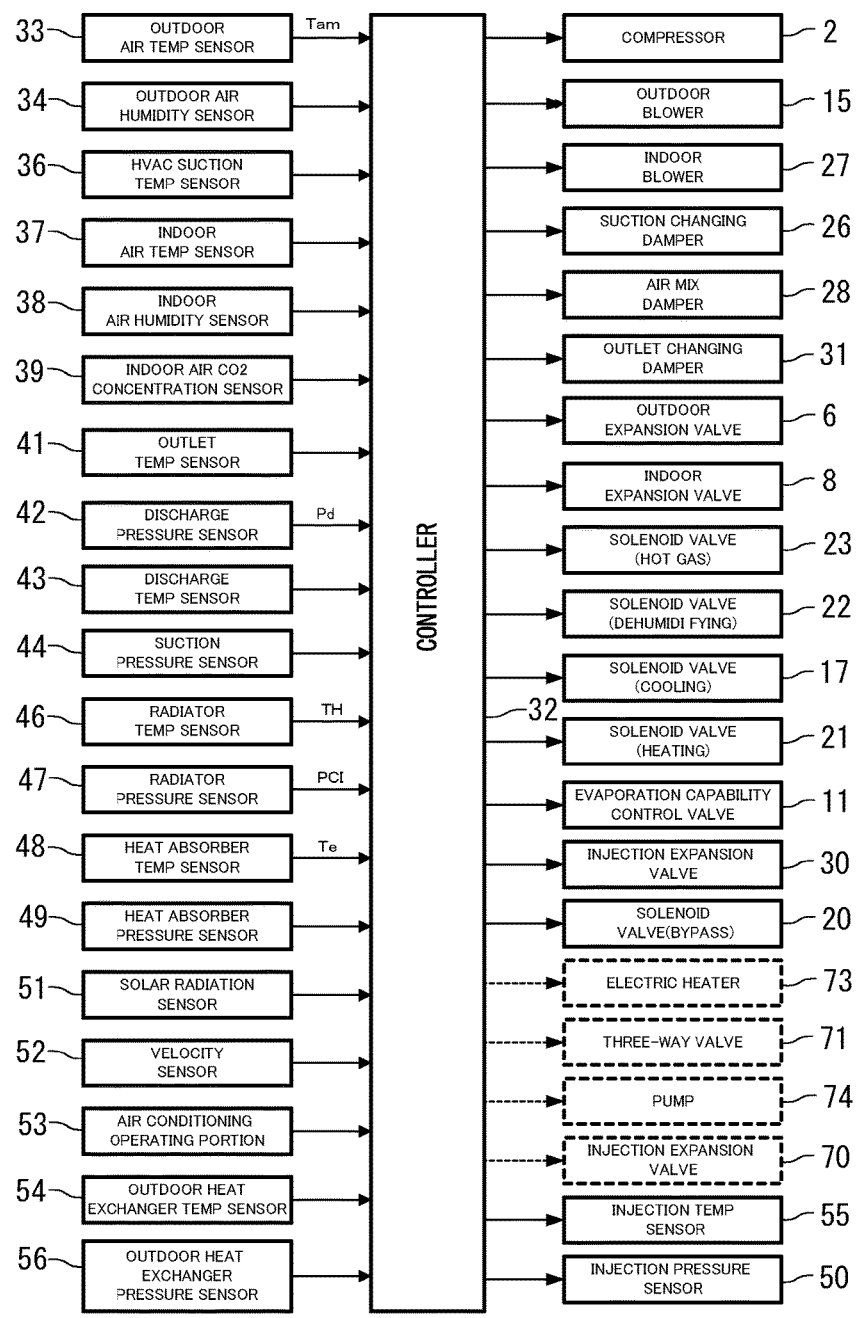
FIG. 2 is a block diagram of an electric circuit of a controller of the vehicle air-conditioning device of FIG. 1.

Next, in FIG. 2, 32 is a controller (ECU) as control means constituted of a microcomputer, and an input of the controller 32 is connected to respective outputs of an outdoor temperature sensor 33 which detects an outdoor temperature of the vehicle, an outdoor humidity sensor 34 which detects an outdoor humidity, an HVAC suction temperature sensor 36 which detects a temperature of the air sucked from the suction port 25 to the air flow passage 3, an indoor air temperature sensor 37 which detects a temperature of the air in the vehicle interior (the indoor air), an indoor air humidity sensor 38 which detects a humidity of the air in the vehicle interior, an indoor $CO_2$ concentration sensor 39 which detects a carbon dioxide concentration in the vehicle interior, an outlet temperature sensor 41 which detects a temperature of the air blown out from the outlet 29 into the vehicle interior, a discharge pressure sensor 42 which detects a pressure of the refrigerant discharged from the compressor 2, a discharge temperature sensor 43 which detects a temperature of the refrigerant discharged from the compressor 2, a suction pressure sensor 44 which detects a suction refrigerant pressure of the compressor 2, a radiator temperature sensor 46 which detects a temperature of the radiator 4 (a refrigerant temperature immediately after the refrigerant flows out from the radiator 4 or the temperature of the radiator 4 itself or an air temperature immediately after the air is heated in the radiator 4), a radiator pressure sensor 47 which detects a refrigerant pressure of the radiator 4 (the pressure in the radiator 4 or the refrigerant pressure immediately after the refrigerant flows out from the radiator 4), a heat absorber temperature sensor 48 which detects a temperature of the heat absorber 9 (the refrigerant temperature immediately after the refrigerant flows out from the heat absorber 9 or the temperature of the heat absorber 9 itself or the air temperature immediately after the air is cooled in the heat absorber 9), a heat absorber pressure sensor 49 which detects a refrigerant pressure of the heat absorber 9 (the pressure in the heat absorber 9 or the refrigerant pressure immediately after the refrigerant flows out from the heat absorber 9), a solar radiation sensor 51 of, e.g., a photo sensor system to detect a solar radiation amount to the vehicle interior, a velocity sensor 52 to detect a moving speed of the vehicle (a velocity), an air conditioning operating portion 53 to set the changing of the set temperature or the operation mode, an outdoor heat exchanger temperature sensor 54 which detects a temperature of the outdoor heat exchanger 7 (the refrigerant temperature immediately after the refrigerant flows out from the outdoor heat exchanger 7 or the temperature of the outdoor heat exchanger 7 itself), and an outdoor heat exchanger pressure sensor 56 which detects the refrigerant pressure of the outdoor heat exchanger 7 (the pressure in the outdoor heat exchanger 7 or the refrigerant pressure immediately after the refrigerant flows out from the outdoor heat exchanger 7).

In addition, the input of the controller 32 is further connected to respective outputs of an injection pressure sensor 50 which detects a pressure of an injection refrigerant flowing into the refrigerant pipe 13K of the injection circuit 40 and returning through the discharge side heat exchanger 35 to the middle of compression by the compressor 2, and an injection temperature sensor 55 which detects a temperature of the injection refrigerant.

On the other hand, an output of the controller 32 is connected to the compressor 2, the outdoor blower 15, the indoor blower (the blower fan) 27, the suction changing damper 26, the air mix damper 28, the suction port changing damper 31, the outdoor expansion valve 6, the indoor expansion valve 8, the respective solenoid valves 23, 22, 17, 21 and 20, the injection expansion valve 30, and the evaporation capability control valve 11. Furthermore, the controller 32 controls these components on the basis of the outputs of the respective sensors and the setting input by the air conditioning operating portion 53.

Next, an operation of the vehicle air-conditioning device 1 of the embodiment having the abovementioned constitution will be described. In the embodiment, the controller 32 changes and executes respective roughly divided operation modes such as a heating mode, a dehumidifying and heating mode, an internal cycle mode, a dehumidifying and cooling mode, and a cooling mode. First, the flow of the refrigerant in each operation mode will be described.

(1) Flow of Refrigerant of Heating Mode

When the heating mode is selected by the controller 32 or a manual operation to the air conditioning operating portion 53, the controller 32 opens the solenoid valve 21 and closes the solenoid valve 17, the solenoid valve 22, the solenoid valve 20 and the solenoid valve 23. Furthermore, the compressor 2 and the respective blowers 15 and 27 are operated, and the air mix damper 28 has a state where the air blown out from the indoor blower 27 is passed through the radiator 4. In consequence, the high-temperature high-pressure gas refrigerant discharged from the compressor 2 flows through the discharge side heat exchanger 35 and then flows into the radiator 4. The air in the air flow passage 3 is passed through the radiator 4, and hence the air in the air flow passage 3 is heated by the high-temperature refrigerant in the radiator 4, whereas the refrigerant in the radiator 4 has the heat taken by the air and is cooled to condense and liquefy.

The refrigerant liquefied in the radiator 4 flows out from the radiator 4, a part of the refrigerant is distributed to the refrigerant pipe 13K of the injection circuit 40, and the refrigerant flows mainly through the refrigerant pipe 13E to reach the outdoor expansion valve 6. It is to be noted that a function and an operation of the injection circuit 40 will be described later. The refrigerant flowing into the outdoor expansion valve 6 is decompressed therein, and then flows into the outdoor heat exchanger 7. The refrigerant flowing into the outdoor heat exchanger 7 evaporates, and the heat is pumped up from the outdoor air passed by running or the outdoor blower 15 (a heat pump). Furthermore, the low-temperature refrigerant flowing out from the outdoor heat exchanger 7 flows through the refrigerant pipe 13D and the solenoid valve 21 to flow from the refrigerant pipe 13C into the accumulator 12 in which gas liquid separation is performed, and then the gas refrigerant is sucked into the compressor 2, thereby repeating this circulation. The air heated in the radiator 4 is blown out from the outlet 29, and hence the heating in the vehicle interior is performed.

The controller 32 controls a revolution number of the compressor 2 on the basis of a high pressure of the refrigerant circuit R which is detected by the discharge pressure sensor 42 or the radiator pressure sensor 47, also controls a valve position of the outdoor expansion valve 6 on the basis of the temperature of the radiator 4 which is detected by the radiator temperature sensor 46 and the refrigerant pressure of the radiator 4 which is detected by the radiator pressure sensor 47, and controls a subcool degree of the refrigerant in the outlet of the radiator 4.

(2) Flow of Refrigerant of Dehumidifying and Heating Mode

Next, in the dehumidifying and heating mode, the controller 32 opens the solenoid valve 22 in the above state of the heating mode. In consequence, a part of the condensed refrigerant flowing through the radiator 4 and the refrigerant pipe 13E is distributed, and flows through the solenoid valve 22 to flow from the refrigerant pipes 13F and 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by a heat absorbing operation at this time, and hence the air is cooled and dehumidified.

The refrigerant evaporated in the heat absorber 9 flows through the evaporation capability control valve 11 and the internal heat exchanger 19 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, and hence the dehumidifying and heating in the vehicle interior are performed.

The controller 32 controls the revolution number of the compressor 2 on the basis of the high pressure of the refrigerant circuit R which is detected by the discharge pressure sensor 42 or the radiator pressure sensor 47, and also controls the valve position of the outdoor expansion valve 6 on the basis of the temperature of the heat absorber 9 which is detected by the heat absorber temperature sensor 48. It is to be noted that in this dehumidifying and heating mode, the gas injection by the injection circuit 40 is not performed, and hence the injection expansion valve 30 is shut off (a shut off position).

(3) Flow of Refrigerant of Internal Cycle Mode

Next, in the internal cycle mode, the controller 32 shuts off the outdoor expansion valve 6 in the above state of the dehumidifying and heating mode (the shut off position), and also closes the solenoid valve 21. When the outdoor expansion valve 6 and the solenoid valve 21 are closed, the refrigerant is inhibited from flowing into the outdoor heat exchanger 7 and flowing out from the outdoor heat exchanger 7, and hence all the condensed refrigerant flowing through the radiator 4 and the refrigerant pipe 13E flows through the solenoid valve 22 to the refrigerant pipe 13F. Furthermore, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19, the refrigerant pipe 13C and the accumulator 12 to be sucked into the compressor 2, thereby repeating this circulation. The air dehumidified in the heat absorber 9 is reheated in the process of passing the radiator 4, and hence the dehumidifying and heating in the vehicle interior are performed. However, in this internal cycle mode, the refrigerant is circulated between the radiator 4 (heat radiation) and the heat absorber 9 (heat absorption) which are present in the air flow passage 3 on an indoor side, and hence the heat is not pumped up from the outdoor air, but a heating capability for consumed power of the compressor 2 is exerted. The whole amount of the refrigerant flows through the heat absorber 9 which exerts a dehumidifying operation, and hence as compared with the above dehumidifying and heating mode, a dehumidifying capability is high, but the heating capability lowers.

The controller 32 controls the revolution number of the compressor 2 on the basis of the temperature of the heat absorber 9 or the abovementioned high pressure of the refrigerant circuit R. At this time, the controller 32 selects a smaller compressor target number of revolution from compressor target numbers of revolution obtained by calculations from the temperature of the heat absorber 9 or the high pressure, to control the compressor 2. It is to be noted that also in this internal cycle mode, the gas injection by the injection circuit 40 is not performed, and hence the injection expansion valve 30 is shut off (the shut off position).

(4) Flow of Refrigerant of Dehumidifying and Cooling Mode

Next, in the dehumidifying and cooling mode, the controller 32 opens the solenoid valve 17 and closes the solenoid valve 21, the solenoid valve 22, the solenoid valve 20 and the solenoid valve 23. Furthermore, the compressor 2 and the respective blowers 15 and 27 are operated, and the air mix damper 28 has the state where the air blown out from the indoor blower 27 is passed through the radiator 4. In consequence, the high-temperature high-pressure gas refrigerant discharged from the compressor 2 flows into the radiator 4 through the discharge side heat exchanger 35. Through the radiator 4, the air in the air flow passage 3 is passed, and hence the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled so that the valve tends to be open, to flow into the outdoor heat exchanger 7. The refrigerant flowing into the outdoor heat exchanger 7 is cooled by the running therein or the outdoor air passed by the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is lower than that during the heating), and hence the dehumidifying and cooling in the vehicle interior are performed.

The controller 32 controls the revolution number of the compressor 2 on the basis of the temperature of the heat absorber 9 which is detected by the heat absorber temperature sensor 48, also controls the valve position of the outdoor expansion valve 6 on the basis of the abovementioned high pressure of the refrigerant circuit R, and controls a refrigerant pressure (a radiator pressure PCI) of the radiator 4. It is to be noted that also in this dehumidifying and cooling mode, the gas injection by the injection circuit 40 is not performed, and hence the injection expansion valve 30 is shut off (the shut off position).

(5) Flow of Refrigerant of Cooling Mode

Next, in the cooling mode, the controller 32 opens the solenoid valve 20 in the above state of the dehumidifying and cooling mode (in this case, the outdoor expansion valve 6 may have any valve position including a fully opened position (the valve position is set to an upper limit of controlling)), and the air mix damper 28 has a state where the air is not passed through the radiator 4. In consequence, the high-temperature high-pressure gas refrigerant discharged from the compressor 2 flows into the radiator 4 through the discharge side heat exchanger 35. The air in the air flow passage 3 is not passed through the radiator 4, the air therefore only passes here, and the refrigerant flowing out from the radiator 4 flows through the refrigerant pipe 13E to reach the solenoid valve 20 and the outdoor expansion valve 6.

At this time, the solenoid valve 20 is opened and hence the refrigerant bypasses the outdoor expansion valve 6 to pass the bypass pipe 13J, and flows into the outdoor heat exchanger 7 as it is, in which the refrigerant is cooled by the running therein or the outdoor air passed through the outdoor blower 15, to condensate and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, so that the air is cooled.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4 but is blown out from the outlet 29 into the vehicle interior, and hence cooling in the vehicle interior is performed. In this cooling mode, the controller 32 controls the revolution number of the compressor 2 on the basis of the temperature of the heat absorber 9 which is detected by the heat absorber temperature sensor 48. It is to be noted that also in this cooling mode, the gas injection by the injection circuit 40 is not performed, and hence the injection expansion valve 30 is shut off (the shut off position).

(6) Gas Injection in Heating Mode

Figure 3:
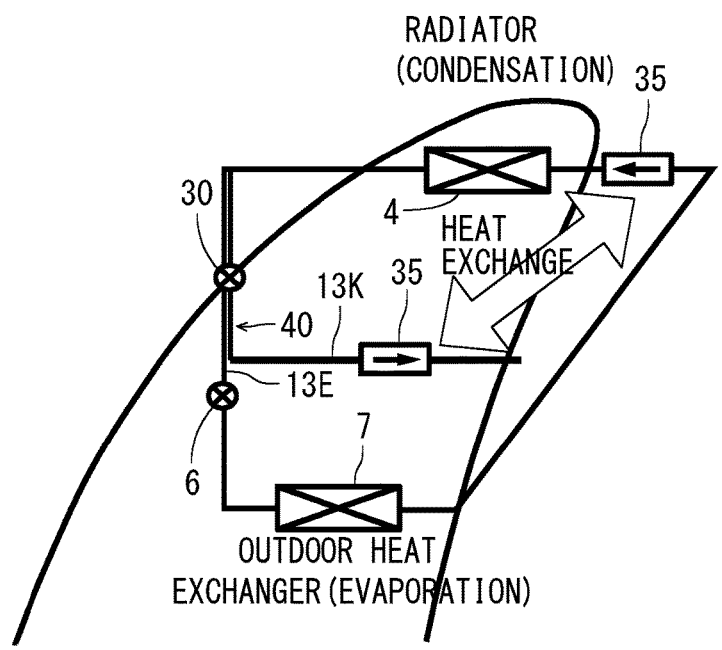
FIG. 3 is a p-h diagram of the vehicle air-conditioning device of FIG. 1.

Next, the gas injection in the above heating mode will be described. FIG. 3 shows a p-h diagram of the vehicle air-conditioning device 1 of the present invention in the heating mode. The refrigerant flowing out from the radiator 4 to enter the refrigerant pipe 13E and then distributed to flow into the refrigerant pipe 13K of the injection circuit 40 is decompressed by the injection expansion valve 30, enters the discharge side heat exchanger 35 to perform the heat exchange with the discharged refrigerant of the compressor 2 (the refrigerant discharged from the compressor 2 before flowing into the radiator 4), and then absorbs heat to evaporate. Afterward, the evaporated gas refrigerant returns to the middle of compression by the compressor 2, is further compressed together with the refrigerant sucked from the accumulator 12 to be compressed, and then discharged from the compressor 2 to the refrigerant pipe 13G again.

In FIG. 3, two portions denoted with 35 and an arrow between the two portions indicate the heat exchange in the discharge side heat exchanger 35. When the refrigerant is returned from the injection circuit 40 to the middle of compression by the compressor 2, the amount of the refrigerant to be discharged from the compressor 2 increases, and hence a heating qualification in the radiator 4 improves. However, when the liquid refrigerant returns to the compressor 2, liquid compression is caused, and hence the refrigerant to be returned from the injection circuit 40 to the compressor 2 has to be a gas.

Therefore, the controller 32 monitors a superheat degree of the refrigerant flowing toward the middle of the compression by the compressor 2, from the pressure and temperature of the refrigerant after the discharge side heat exchanger 35 which are detected by the injection pressure sensor 50 and the injection temperature sensor 55, respectively, as described later, and the controller controls the valve position of the injection expansion valve 30 so that a predetermined superheat degree is attached in the heat exchange with the discharged refrigerant. However, in the present invention, the heat exchange between the remarkably high-temperature refrigerant discharged from the compressor 2 before flowing into the radiator 4 and the refrigerant flowing through the injection circuit 40 is performed in the discharge side heat exchanger 35, and hence a large heat exchange amount can be obtained. Therefore, even when the valve position of the injection expansion valve 30 is enlarged to increase an injection amount, the refrigerant can also sufficiently evaporate in the discharge side heat exchanger 35, and a necessary superheat degree can be obtained.

In consequence, according to the present invention, the gas injection amount to the compressor 2 can sufficiently be acquired and the amount of the refrigerant to be discharged from the compressor 2 can be increased to improve the heating qualification, as compared with a case where the heat exchange between the refrigerant after the radiator and the injection refrigerant is performed as in a conventional technology.

Next, the control of the injection circuit 40 in the above heating mode will be described with reference to FIG. 4 to FIG. 12.

Figure 4:
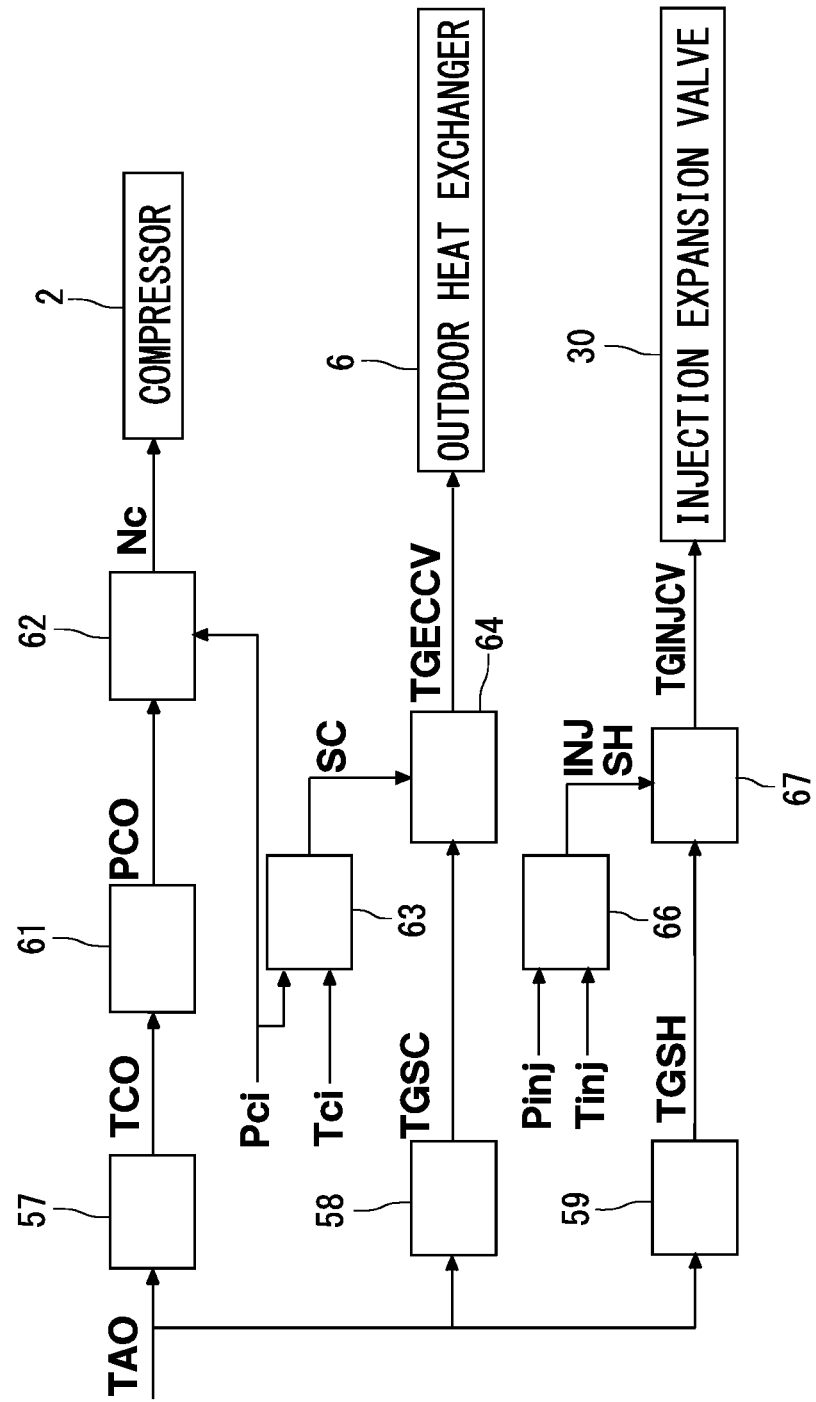
FIG. 4 is a control block diagram of the controller of FIG. 2.

(6-1) Control Block of Compressor, Outdoor Expansion Valve and Injection Expansion Valve FIG. 4 shows a control block diagram of the compressor 2, the outdoor expansion valve 6 and the injection expansion valve 30 by the controller 32 in the above heating mode. The controller 32 inputs a target outlet temperature TAO into a target radiator temperature calculating portion 57, a target radiator subcool degree calculating portion 58 and a target injection refrigerant superheat degree calculating portion 59. The target outlet temperature TAO is a target value of the temperature of the air blown out from the outlet 29 into the vehicle interior, and is calculated by the controller 32 in accordance with Equation (I) mentioned below.

$$TAO=(Tset-Tin) \times K + Tbal(f(Tset, SUN, Tam))  \quad (I)$$

Figure 5:
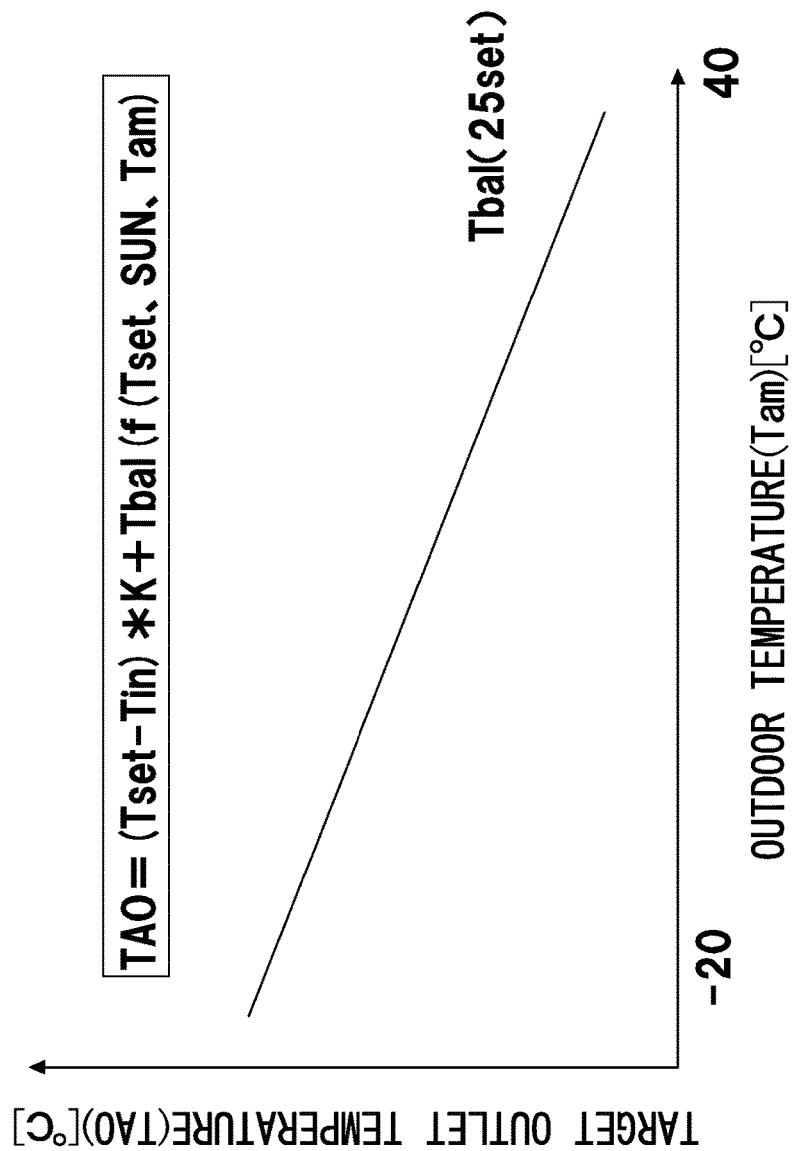
FIG. 5 is a diagram to explain determination of a target outlet temperature by the controller of FIG. 2.

Here, Tset is a set temperature in the vehicle interior which is set by the air conditioning operating portion 53, Tin is a temperature of interior air which is detected by the indoor air temperature sensor 37, K is a coefficient, and Tbal is a balance value calculated from the set temperature Tset, a solar radiation amount SUN detected by the solar radiation sensor 51, and an outdoor temperature Tam detected by the outdoor temperature sensor 33. Furthermore, in general, the target outlet temperature TAO heightens when the outdoor temperature Tam becomes lower, and lowers when the outdoor temperature Tam rises, as shown in FIG. 5.

The target radiator temperature calculating portion 57 of the controller 32 calculates a target radiator temperature TCO from the target outlet temperature TAO, and next a target radiator pressure calculating portion 61 of the controller 32 calculates a target radiator pressure PCO on the basis of the target radiator temperature TCO. Furthermore, a compressor revolution number calculating portion 62 of the controller 32 calculates a revolution number Nc of the compressor 2 on the basis of the target radiator pressure PCO and a pressure Pci of the radiator 4 (the radiator pressure) which is detected by the radiator pressure sensor 47, and the controller operates the compressor 2 at the revolution number Nc. That is, the controller 32 controls the pressure Pci of the radiator 4 in accordance with the revolution number Nc of the compressor 2.

In addition, the target radiator subcool degree calculating portion 58 of the controller 32 calculates a target radiator subcool degree TGSC of the radiator 4 on the basis of the target outlet temperature TAO. On the other hand, a radiator subcool degree calculating portion 63 of the controller 32 calculates a subcool degree of the refrigerant in the radiator 4 (a radiator subcool degree SC) on the basis of the radiator pressure Pci and the temperature of the radiator 4 (a radiator temperature Tci) which is detected by the radiator temperature sensor 46. Furthermore, a target outdoor expansion valve position calculating portion 64 of the controller calculates a target valve position of the outdoor expansion valve 6 (a target outdoor expansion valve position TGECCV) on the basis of the radiator subcool degree SC and the target radiator subcool degree TGSC. Furthermore, the controller 32 controls the valve position of the outdoor expansion valve 6 into the target outdoor expansion valve position TGECVV.

The radiator subcool degree calculating portion 63 of the controller 32 performs the calculation in such a direction as to raise the target radiator subcool degree TGSC, when the target outlet temperature TAO becomes higher, but the present invention is not limited to this embodiment, and the portion may perform the calculation on the basis of an after-mentioned difference (a qualification difference) between a demand heating qualification Qtgt and a heating qualification Qhp, the radiator pressure Pci, or a difference (a pressure difference) between the target radiator pressure PCO and the pressure Pci. In this case, the controller 32 lowers the target radiator subcool degree TGSC, when the qualification difference becomes smaller, the pressure difference becomes smaller, an air volume of the indoor blower 27 becomes smaller or the radiator pressure Pci becomes smaller.

Furthermore, the target injection refrigerant superheat degree calculating portion 59 of the controller 32 calculates a target value of the superheat degree of the injection refrigerant to be returned from the injection circuit 40 to the middle of compression by the compressor 2 (a target injection refrigerant superheat degree TGSH) on the basis of the target outlet temperature TAO. On the other hand, an injection refrigerant superheat degree calculating portion 66 of the controller 32 calculates a superheat degree INJSH of the injection refrigerant on the basis of a pressure of the injection refrigerant (an injection refrigerant pressure Pinj) which is detected by the injection pressure sensor 50 and a temperature of the injection refrigerant (an injection refrigerant temperature Tinj) which is detected by the injection temperature sensor 55.

Furthermore, a target injection expansion valve position calculating portion 67 calculates a target valve position of the injection expansion valve 30 (a target injection expansion valve position TGINJCV) on the basis of the injection refrigerant superheat degree INJSH and the target injection refrigerant superheat degree TGSH. Furthermore, the controller 32 controls the valve position of the injection expansion valve 30 into the target injection expansion valve position TGINJCV.

Figure 6:
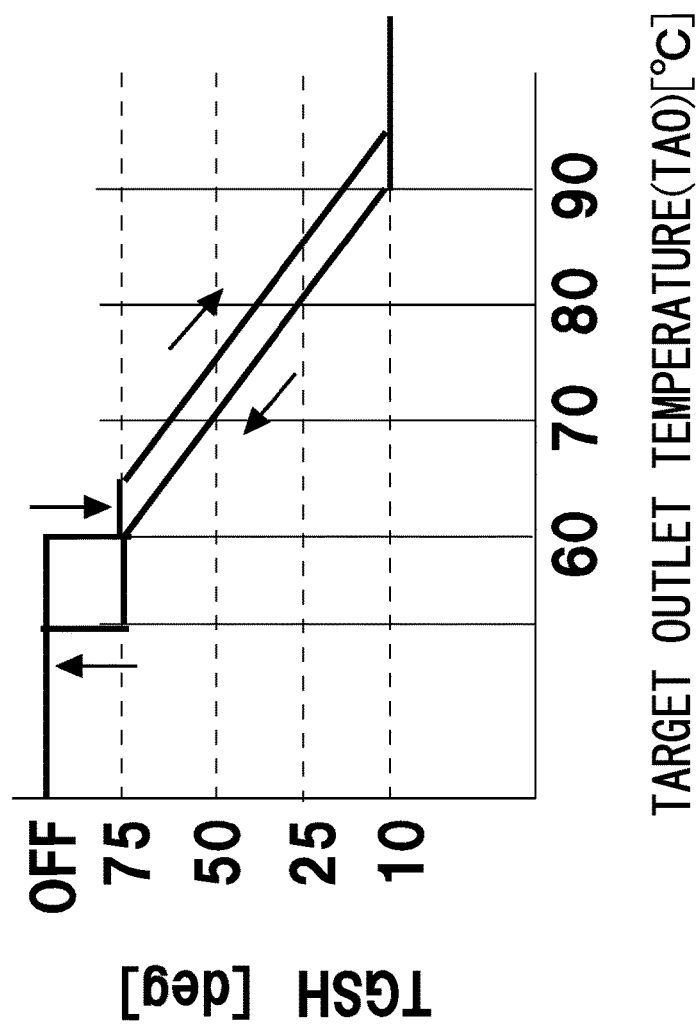
FIG. 6 is a diagram to explain determination of a target injection refrigerant superheat degree by use of the target outlet temperature by the controller of FIG. 2.

FIG. 6 shows calculation of the target injection refrigerant superheat degree TGSH which is executed by using the target outlet temperature TAO by the target injection refrigerant superheat degree calculating portion 59 of the controller 32. As it is clear from this drawing, the target injection refrigerant superheat degree calculating portion 59 lowers the target injection refrigerant superheat degree TGSH, when the target outlet temperature TAO becomes higher (a hysteresis is present). When the target injection refrigerant superheat degree TGSH is lowered, the valve position of the injection expansion valve 30 is enlarged to increase the injection amount. That is, when the target outlet temperature TAO becomes higher, the controller 32 increases the injection amount to be returned to the compressor 2 by the injection expansion valve 30, so that the amount of the refrigerant to be discharged from the compressor 2 is increased to enhance the heating qualification.

Figure 7:
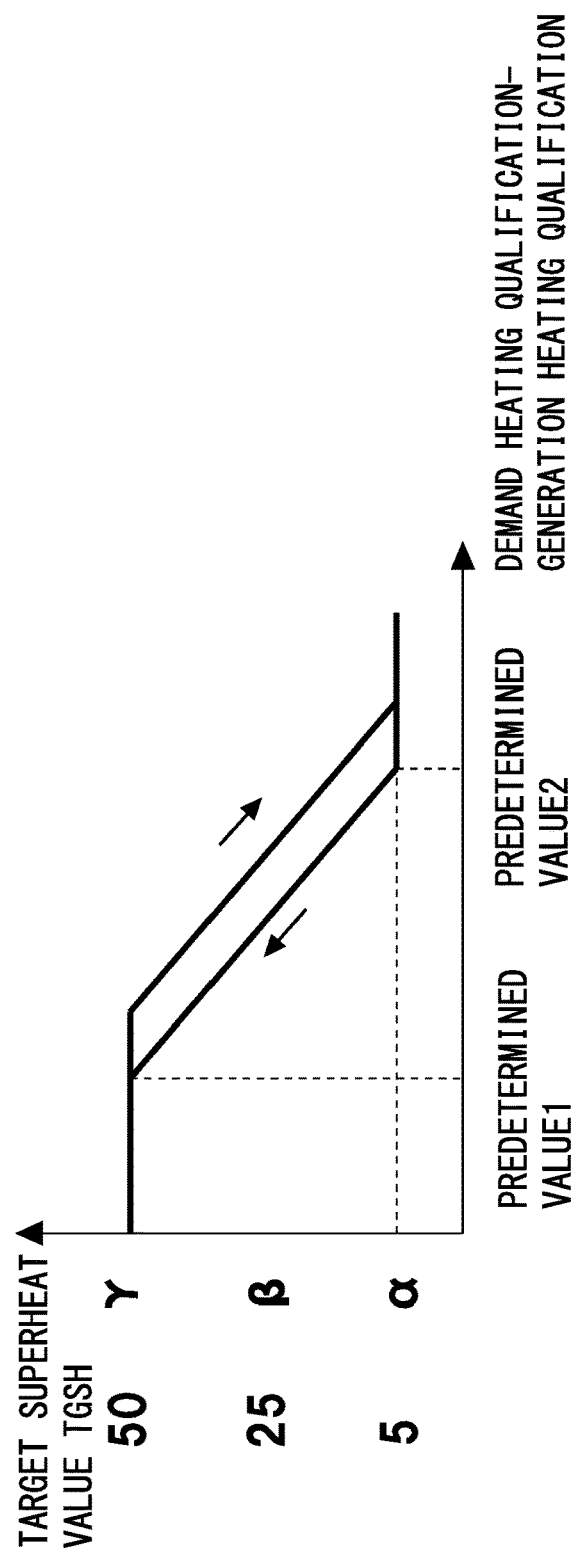
FIG. 7 is a diagram to explain the determination of the target injection refrigerant superheat degree by use of a difference between a demand heating qualification and a heating qualification (a generation heating qualification) by the controller of FIG. 2.
Figure 8:
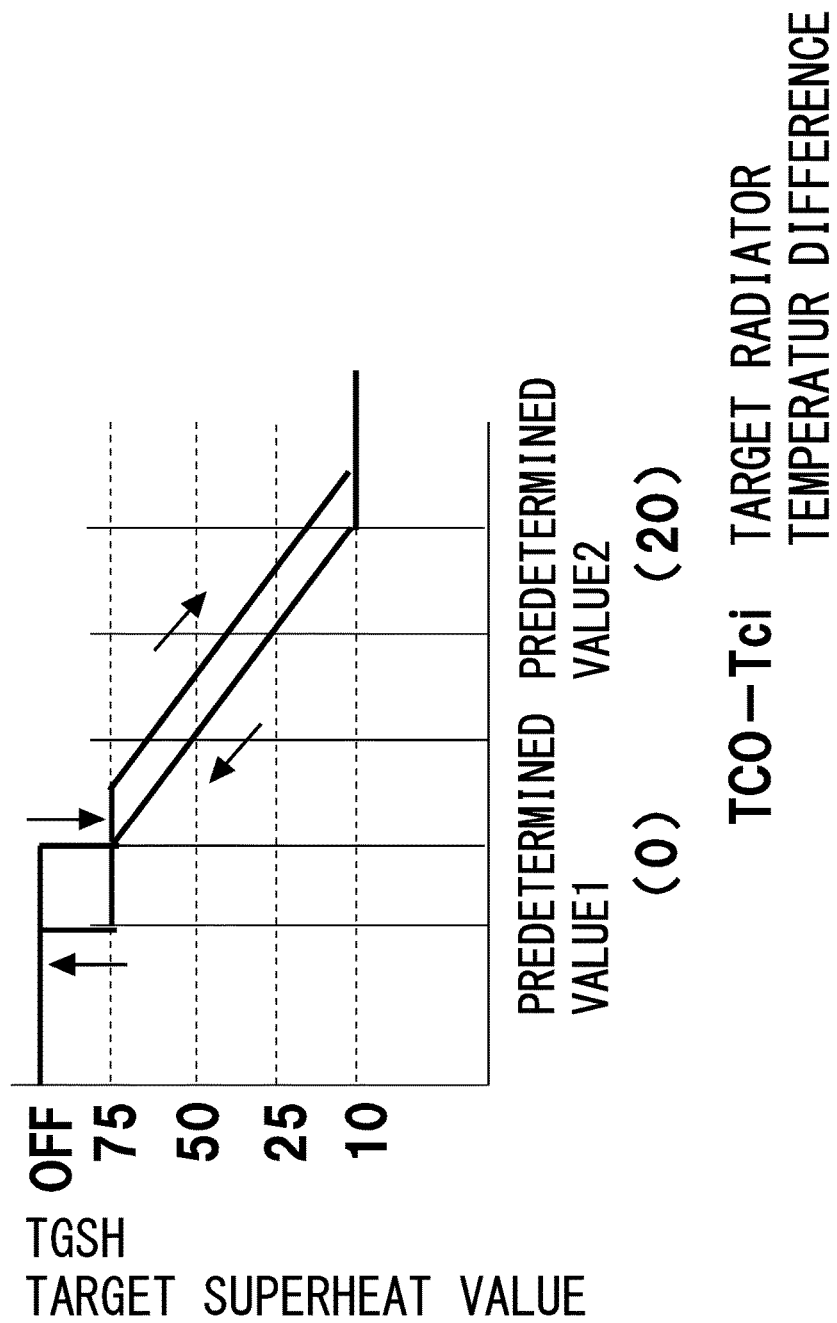
FIG. 8 is a diagram to explain the determination of the target injection refrigerant superheat degree by use of a difference between a target radiator temperature and a radiator temperature by the controller of FIG. 2.
Figure 9:
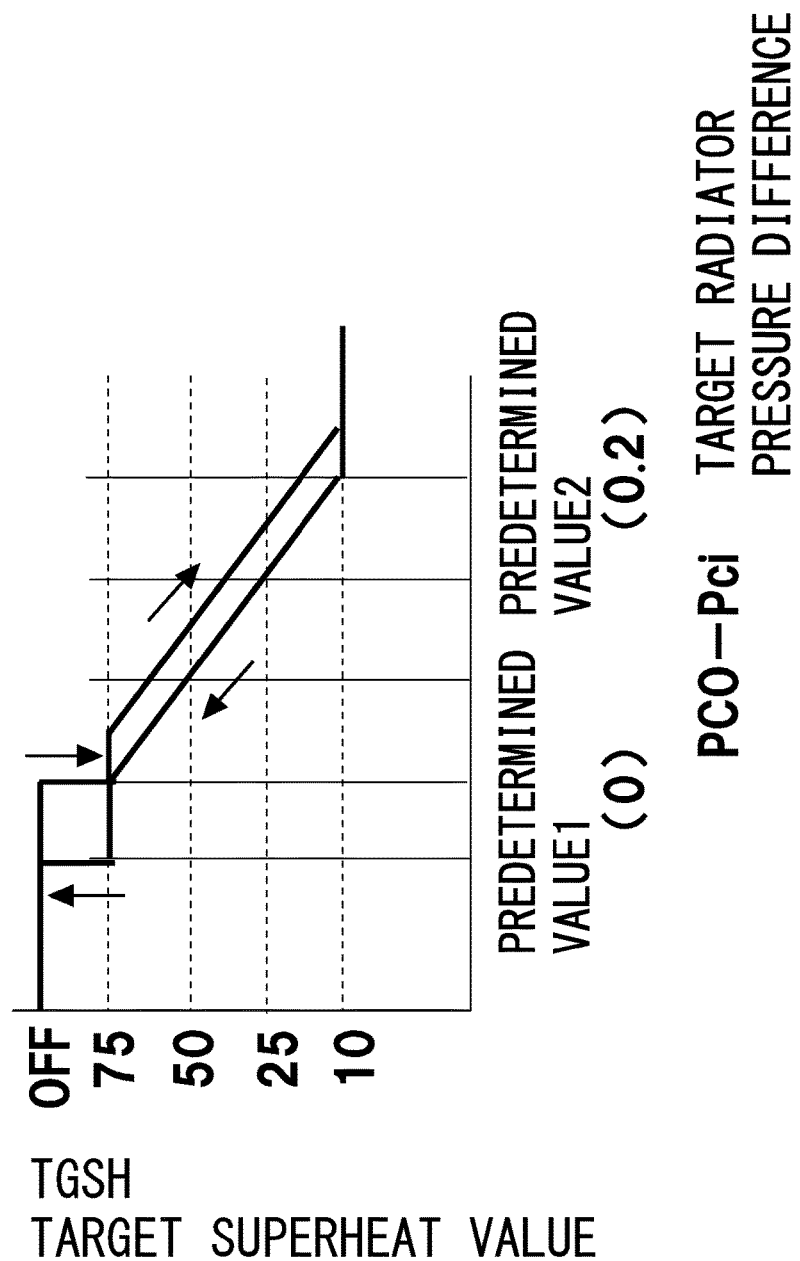
FIG. 9 is a diagram to explain the determination of the target injection refrigerant superheat degree by use of a difference between a target radiator pressure and a radiator pressure by the controller of FIG. 2.

It is to be noted that the target injection refrigerant superheat degree TGSH is not limited to this embodiment, or additionally, the degree may be calculated on the basis of an after-mentioned difference (a qualification difference in FIG. 7) between the demand heating qualification Qtgt and the heating qualification Qhp, a difference (a temperature difference in FIG. 8) between the target radiator temperature TCO and the radiator temperature Tci (a detected value of an air temperature immediately after the radiator 4 or an estimated value of an air temperature immediately after the radiator 4), or a difference (a pressure difference in FIG. 9) between the target radiator pressure PCO and the radiator pressure Pci, or any combination thereof. In this case, as shown in FIG. 7, when the qualification difference becomes larger, the controller 32 decreases the target injection refrigerant superheat degree TGSH from γ (e.g., 50) toward α (e.g., 5), between a predetermined value 1 and a predetermined value 2. As shown in FIG. 8, when the temperature difference becomes larger, the controller decreases the target injection refrigerant superheat degree TGSH from OFF to, for example, 10, between a predetermined value 1 and a predetermined value 2 (a hysteresis is present). As shown in FIG. 9, when the pressure difference becomes larger, the controller decreases the target injection refrigerant superheat degree TGSH from OFF to, for example, 10, between a predetermined value 1 and a predetermined value 2 (a hysteresis is present).

Alternatively, when a limit line of the heating qualification Qhp by the radiator 4 during the control in accordance with each target injection refrigerant superheat degree TGSH is beforehand measured or estimated at the after-mentioned demand heating qualification Qtgt in accordance with the outdoor temperature Tam, it may be judged whether or not the heating qualification Qhp corresponding to the target injection refrigerant superheat degree TGSH satisfies the demand heating qualification, so that the target injection refrigerant superheat degree TGSH may be determined.

(6-2) Injection Executability Judgment 1

Next, one embodiment of an executability judgment of the gas injection by use of the injection circuit 40 will be described with reference to FIG. 10 and FIG. 11. First, the controller 32 calculates the demand heating qualification Qtgt which is the demanded heating qualification of the radiator 4, and the heating qualification Qhp (i.e., a limit value of the heating qualification) which can be generated by the radiator 4 when the refrigerant is not allowed to flow through the injection circuit 40, i.e., when the gas injection is not performed, by use of Equation (II) and Equation (III).

$$Qtgt=(TCO-Te) \times Cpa \times \rho \times Qair \qquad (II)$$

$$Qhp=f(Tam, Nc, BLV, VSP, Te) \qquad (III)$$

Here, Te is the temperature of the heat absorber 9 which is detected by the heat absorber temperature sensor 48, Cpa is specific heat [kj/kg·K] of the air flowing into the radiator 4, ρ is a density (a specific volume) [kg/m$^3$] of the air flowing into the radiator 4, Qair is an air volume [m$^3$/h] of the air passing the radiator 4 (estimated from a blower voltage BLV of the indoor blower 27 or the like), and VSP is a velocity which can be obtained from the velocity sensor 52.

It is to be noted that in Equation (II), the temperature of the air flowing into the radiator 4 or the temperature of the air flowing out from the radiator 4 may be employed in place of or in addition to Qair. Additionally, the revolution number Nc of the compressor 2 of Equation (III) is one example of an index indicating a refrigerant flow rate, the blower voltage BLV is one example of an index indicating the air volume in the air flow passage 3, and the heating qualification Qhp is calculated from these functions. In addition, Qhp may be calculated from one of these functions, an outlet refrigerant pressure of the radiator 4, an outlet refrigerant temperature of the radiator 4, an inlet refrigerant pressure of the radiator 4 and an inlet refrigerant temperature of the radiator 4, or any combination thereof.

Figure 10:
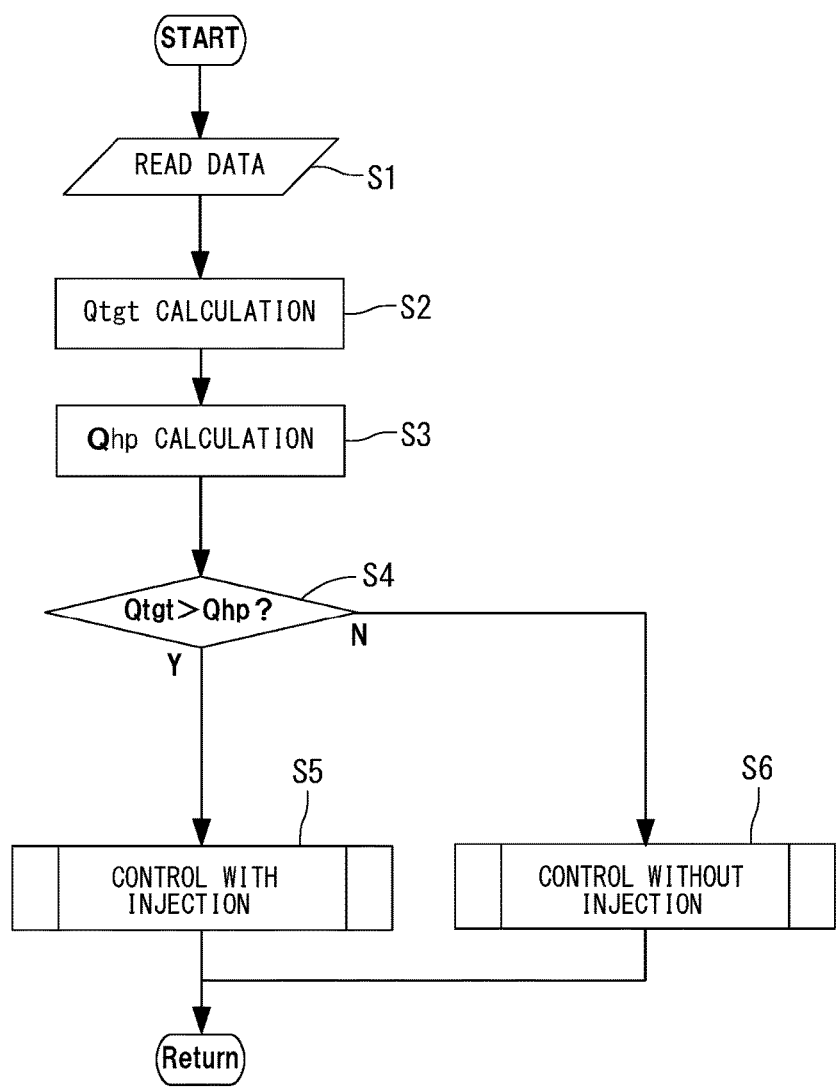
FIG. 10 is a flowchart showing one example of injection executability judgment by the controller of FIG. 2.

The controller 32 reads data from each sensor in step S1 of a flowchart of FIG. 10, and calculates the demand heating qualification Qtgt by use of Equation (II) mentioned above in step S2. Next, in step S3, the controller calculates the heating qualification Qhp when the gas injection is not performed, by use of Equation (III) mentioned above, and judges whether or not the demand heating qualification Qtgt is larger than the heating qualification Qhp in step S4.

Figure 11:
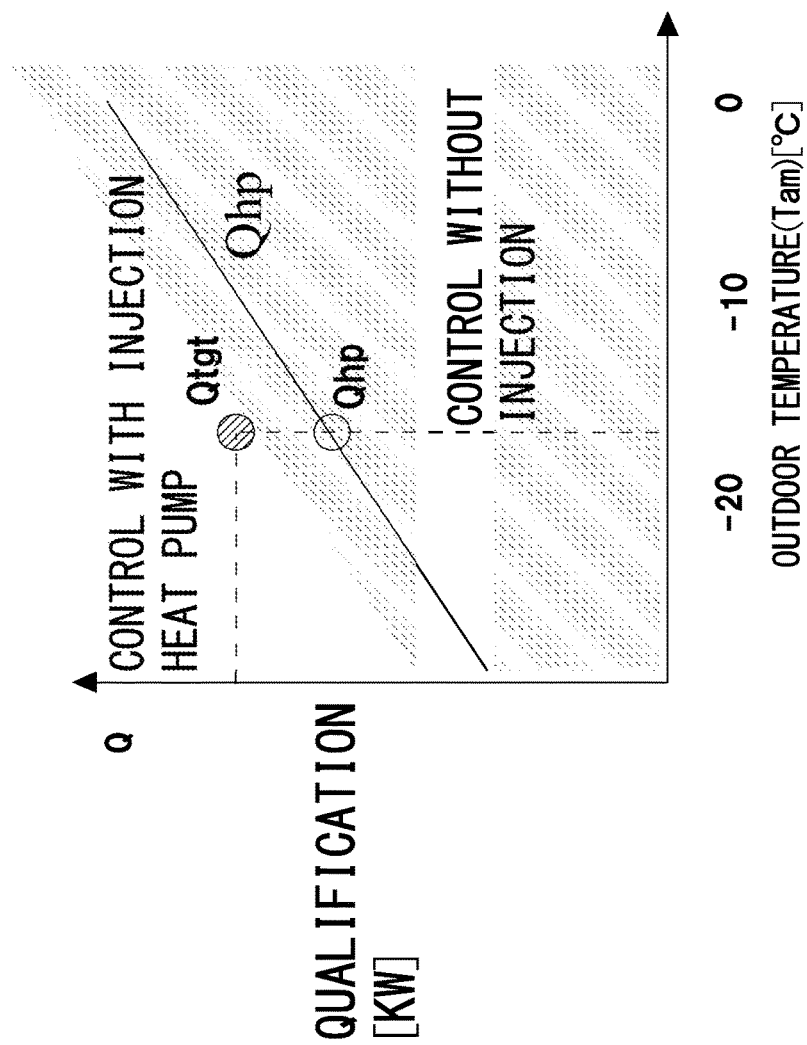
FIG. 11 is a diagram showing an actual example of the injection executability judgment of FIG. 10.

A diagonal line of FIG. 11 indicates the limit line of the heating qualification Qhp by the radiator 4, when the gas injection is not performed by the injection circuit 40, the abscissa indicates the outdoor temperature Tam, and the ordinate indicates the heating qualification. When the demand heating qualification Qtgt is the (limit line of) heating qualification Qhp of FIG. 11 or less, i.e., when the heating qualification Qhp of the radiator 4 satisfies the demand heating qualification Qtgt, the step advances to step S6 in which it is judged that control without injection is executed (the gas injection is not executable), and when the demand heating qualification Qtgt is larger than the limit line (the diagonal line) of the heating qualification Qhp as shown in FIG. 11, i.e., when the heating qualification Qhp of the radiator 4 is lower than the demand heating qualification Qtgt, the step advances to step S5 in which it is judged that control with injection is executed (the gas injection is executable). When the control without injection is judged in step S6, the controller 32 shuts off the injection expansion valve 30 (the shut off position) and does not allow the refrigerant to flow through the injection circuit 40. On the other hand, when the control with injection is judged in the step S5, the valve position of the injection expansion valve 30 is opened at a predetermined value, and the gas injection to the compressor 2 is performed.

Figure 12:
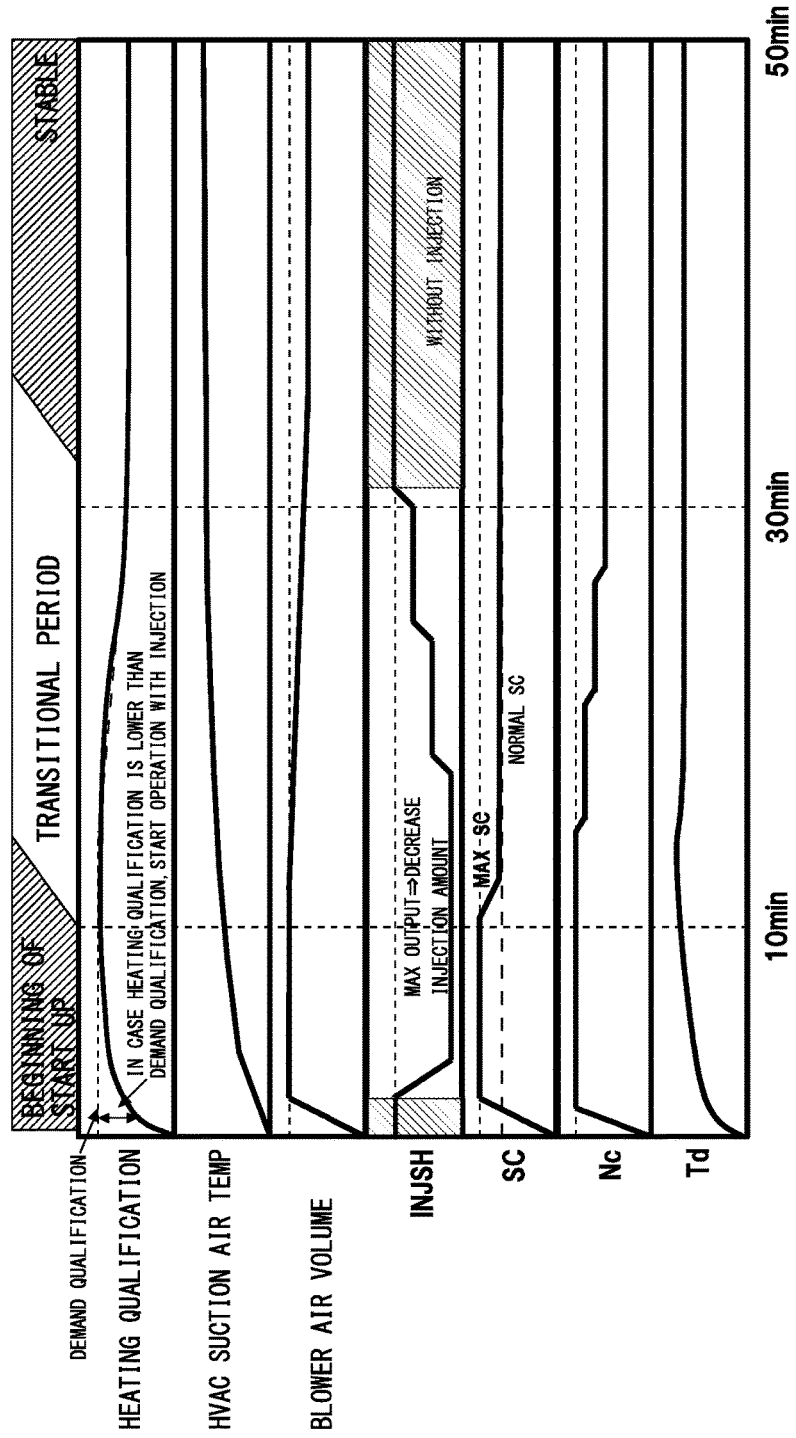
FIG. 12 is a timing chart showing a state of each component after startup of the vehicle air-conditioning device of FIG. 1.

FIG. 12 shows a timing chart after startup of the vehicle air-conditioning device 1 of the embodiment. When the demand heating qualification Qtgt is higher than the heating qualification Qhp, the control with injection is judged, and by the control of the injection expansion valve 30, the target injection superheat degree TGSH is lowered to increase the injection amount to be returned to the middle of compression by the compressor 2 (INJSH is small). It is to be noted that in the embodiment, the gas injection is prohibited while a discharge pressure Pd of the compressor 2 is low immediately after the startup. Furthermore, when time passes from the startup and an operation state becomes more stable, the injection amount is decreased (INJSH is made larger), and when the heating qualification Qhp finally satisfies the demand heating qualification Qtgt, the control without injection is performed.

In consequence, when the controller 32 compares the demand heating qualification Qtgt which is the demanded heating qualification of the radiator 4 with the heating qualification Qhp generated by the radiator 4 and the heating qualification Qhp is lower than the demand heating qualification Qtgt, the refrigerant is allowed to flow through the injection circuit 40 by the injection expansion valve 30, so that it is possible to suitably control the gas injection to the compressor 2, inhibit deterioration of an efficiency when the refrigerant flowing through the injection circuit 40 is evaporated by the discharged refrigerant of the compressor 2, and efficiently realize improvement of the heating qualification by the gas injection.

It is to be noted that the present invention is not limited to the above embodiment, and the controller 32 calculates the demand heating qualification Qtgt on the basis of one of indexes indicating the temperature of the air flowing into the radiator 4, the temperature of the air flowing out from the radiator 4 and the volume of the air passing the radiator 4, or any combination of these indexes, and indexes indicating the specific heat Cpa of the air flowing into the radiator 4 and the density ρ of this air. Furthermore, the controller calculates the heating qualification Qhp on the basis of one of indexes indicating the outdoor temperature Tam, the refrigerant flow rate, the air volume in the air flow passage 3, the velocity and the temperature Te of the heat absorber 9, or any combination of these indexes, so that it is possible to more accurately control the gas injection to the compressor 2.

Furthermore, as described above, the controller 32 controls the amount of the refrigerant to be returned from the injection circuit 40 to the compressor 2 by the injection expansion valve 30 on the basis of one of the difference between the demand heating qualification Qtgt demanded for the radiator 4 and the heating qualification Qhp of the radiator, the difference between the target radiator temperature TCO and the radiator temperature Tci (the detected value of the air temperature immediately after the radiator 4 or the estimated value of the air temperature immediately after the radiator 4), the difference between the target radiator pressure PCO and the radiator pressure Pci, and the target outlet temperature to the vehicle interior, or any combination thereof, so that the amount of the refrigerant to be returned to the compressor 2 can accurately be regulated by the gas injection.

(6-3) Injection Executability Judgment 2

Figure 13:
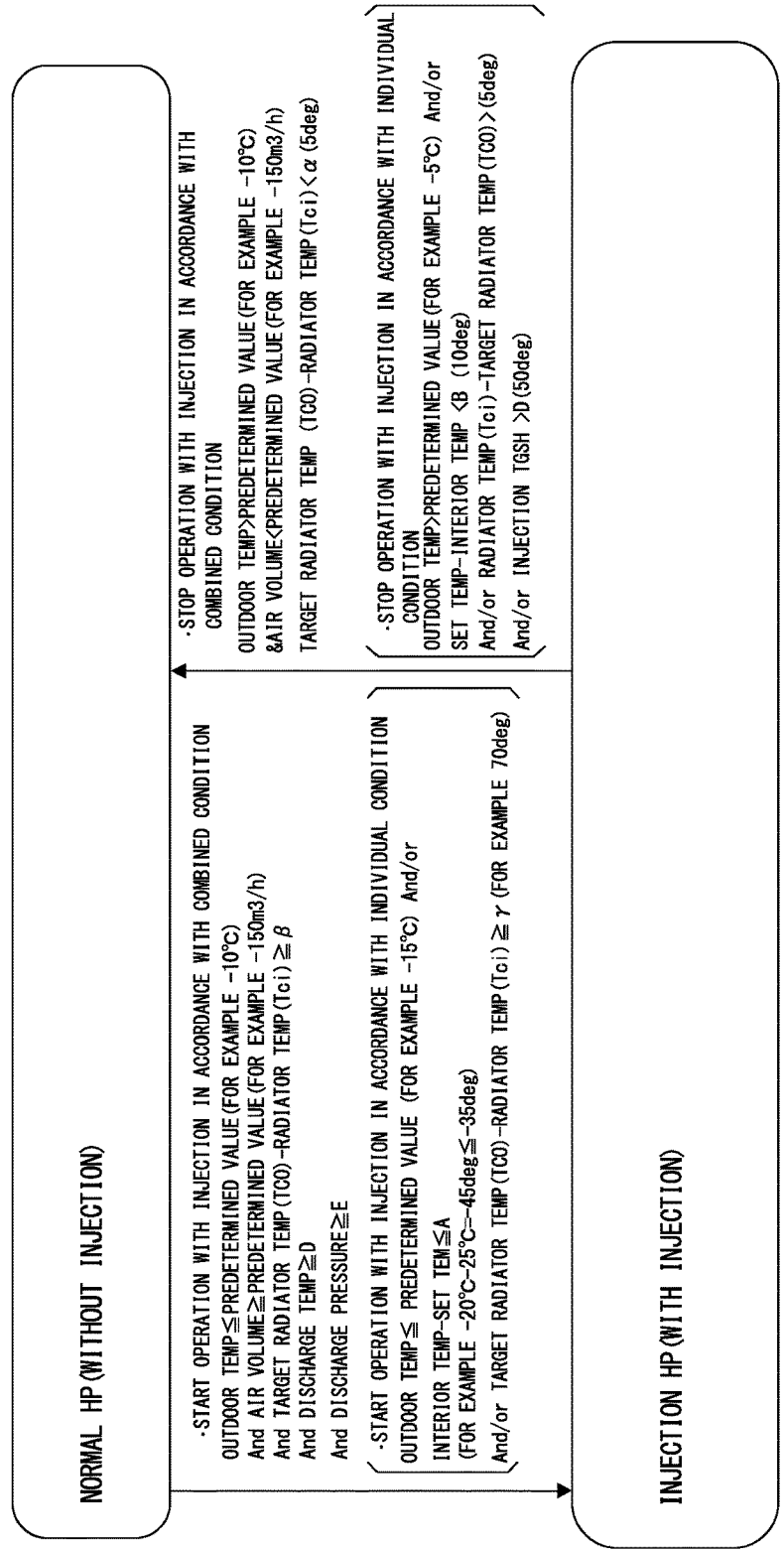
FIG. 13 is a diagram showing another example of the injection executability judgment by the controller of FIG. 2.

Next, another embodiment of the executability judgment of the gas injection by use of the injection circuit 40 will be described with reference to FIG. 13. In the above embodiment, it is determined whether or not to allow the refrigerant to flow through the injection circuit 40, by the comparison between the demand heating qualification Qtgt and the heating qualification Qhp, but in this embodiment, the determination is made on the basis of an environmental condition of the vehicle air-conditioning device 1. FIG. 13 shows the example. A combined condition indicating worsening of the environmental condition to perform the gas injection from the control without injection (normal HP) in which the gas injection is not performed is as follows.

The outdoor temperature Tam a predetermined value (e.g., −10° C.), and the air volume in the air flow passage 3≥a predetermined value (e.g., 150 m³/h), and the target radiator temperature TCO−the radiator temperature Tci (the detected value of the air temperature immediately after the radiator 4 or the estimated value of the air temperature immediately after the radiator 4)≥β, and the discharge temperature of the compressor 2≥D, and the discharge pressure of the compressor 2≥E.

When the combined condition is established, the injection expansion valve 30 is opened to perform the gas injection to the compressor 2 by the injection circuit 40. Afterward, the valve position control of the injection expansion valve 30 is similar to the abovementioned control. It is to be noted that predetermined values of β, D and E mentioned above are beforehand obtained by experiments or the like.

In addition, when one of the following conditions is established as an individual condition indicating the worsening of the environmental condition, the gas injection is performed.

The outdoor temperature Tam≤a predetermined value (e.g., −15° C. which is lower than the above value), and/or an interior temperature (e.g., −20° C.)−the set temperature (e.g., a set value of 25° C. of the interior temperature) ≤A (e.g., −35 deg), and/or the target radiator temperature TCO−the radiator temperature Tci (the detected value of the air temperature immediately after the radiator 4 or the estimated value of the air temperature immediately after the radiator 4)≥γ (e.g., 70 deg).

It is to be noted that when the following condition is established as a combined condition in the case of reset, the injection expansion valve 30 is closed to stop the gas injection.

The outdoor temperature Tam>a predetermined value (e.g., −10° C.), and the air volume in the air flow passage 3<a predetermined value (e.g., 150 m³/h), and the target radiator temperature TCO−the radiator temperature Tci (the detected value of the air temperature immediately after the radiator 4 or the estimated value of the air temperature immediately after the radiator 4)<α (a predetermined value smaller than β).

When one of the following conditions is established as an individual condition in the case of the reset, the gas injection is stopped.

The outdoor temperature Tam>a predetermined value (e.g., −5° C. which is lower than the above value), and/or the set temperature−the interior temperature<B (e.g., 10 deg), and/or the radiator temperature Tci (the detected value of the air temperature immediately after the radiator 4 or the estimated value of the air temperature immediately after the radiator 4)−the target radiator temperature TCO>(e.g., 5 deg), and/or the target injection refrigerant superheat degree TGSH>D (e.g., 50 deg).

It is to be noted that the target outlet temperature TAO>a predetermined value (e.g., 60° C.) may be added to the outdoor temperature Tam≤the predetermined value of the above individual condition. Furthermore, when the above individual condition, e.g., the outdoor temperature Tam≤the predetermined value (and the target outlet temperature TAO>the predetermined value) is established, the gas injection is executed irrespective of the other conditions, and when the individual condition is not established, the controller 32 judges the above combined condition.

As described above or as it is not limited to the above, the controller 32 judges whether or not the environmental condition in the heating mode worsens, on the basis of the environmental condition judged from one of indexes indicating the outdoor temperature Tam, the air volume in the air flow passage 3, the difference between the target radiator temperature TCO and the radiator temperature Tci, a discharge refrigerant temperature of the compressor 2 and a discharge refrigerant pressure of the compressor 2, or any combination of these indexes. When the environmental condition worsens, the refrigerant is allowed to flow through the injection circuit 40 by the injection expansion valve 30, so that it is also possible to accurately control the gas injection to the compressor 2.

(7-1) Another Example 1 of Injection Circuit

Figure 14:
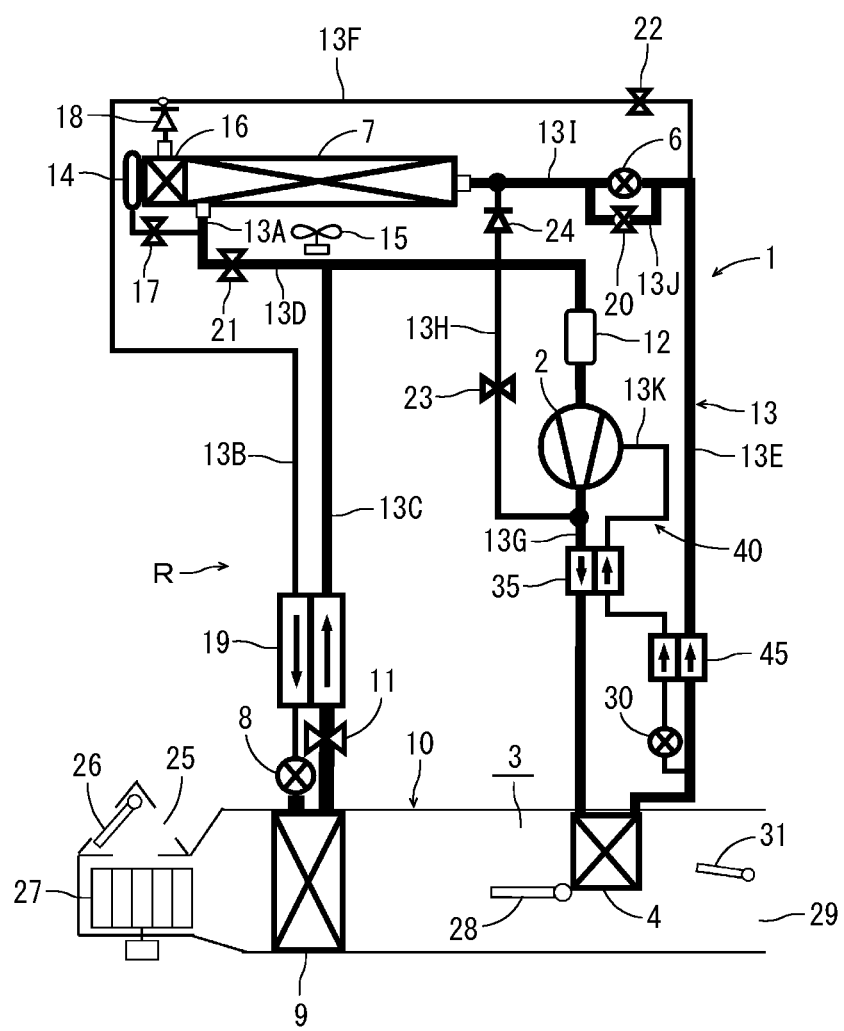
FIG. 14 is a constitutional view of a vehicle air-conditioning device of another embodiment of the present invention.

Next, FIG. 14 shows another constitutional view of the vehicle air-conditioning device 1 of the present invention. In this embodiment, an injection circuit 40 comprises a radiator outlet side heat exchanger 45 between an injection expansion valve 30 and a discharge side heat exchanger 35 in the injection circuit 40, in addition to the constitution of FIG. 1. The radiator outlet side heat exchanger 45 performs heat exchange between a refrigerant decompressed by the injection expansion valve 30 and a refrigerant flowing out from a radiator 4 to flow through a refrigerant pipe 13E and flowing toward an outdoor expansion valve 6. Furthermore, the refrigerant flowing out from the radiator outlet side heat exchanger 45 (an injection refrigerant) flows into the discharge side heat exchanger 35.

Consequently, in addition to the discharge side heat exchanger 35, the radiator outlet side heat exchanger 45 is disposed in the injection circuit 40, so that also by the heat exchange with the refrigerant flowing out from the radiator 4, the injection refrigerant to be returned to the middle of compression by the compressor 2 can be evaporated. In consequence, it is also possible to inhibit the disadvantage that enthalpy of the refrigerant flowing into the radiator 4 is unnecessarily lowered for gas injection.

(7-2) Still Another Example 2 of Injection Circuit

Figure 15:
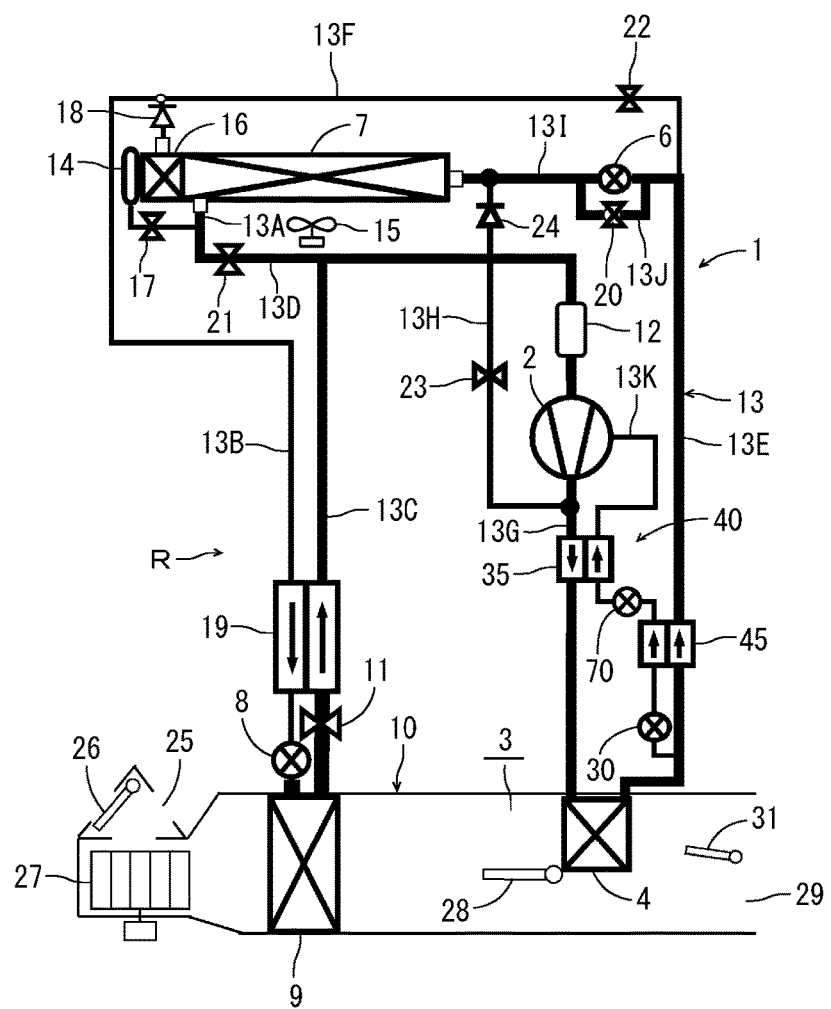
FIG. 15 is a constitutional view of a vehicle air-conditioning device of still another embodiment of the present invention.

Next, FIG. 15 shows still another constitutional view of the vehicle air-conditioning device 1 of the present invention. In this embodiment, an injection circuit 40 comprises another injection expansion valve 70 (pressure reducing means) constituted of an electric valve on an outlet side of a radiator outlet side heat exchanger 45, i.e., between the radiator outlet side heat exchanger 45 and a discharge side heat exchanger 35 in the injection circuit 40, in addition to the constitution of FIG. 14. Furthermore, in this case, a controller 32 controls a valve position of an injection expansion valve 30 on the basis of a refrigerant superheat degree in an outlet of the radiator outlet side heat exchanger 45, and controls a valve position of the injection expansion valve 70 on the basis of a refrigerant superheat degree on an outlet side of the discharge side heat exchanger 35.

According to this constitution, in addition to the example of FIG. 14, evaporation of the refrigerant in the respective heat exchangers 45 and 35 can precisely be controlled, and the lowering of the enthalpy of the refrigerant flowing into the radiator 4 can accurately be inhibited.

(7-3) Further Example 3 of Injection Circuit

Figure 16:
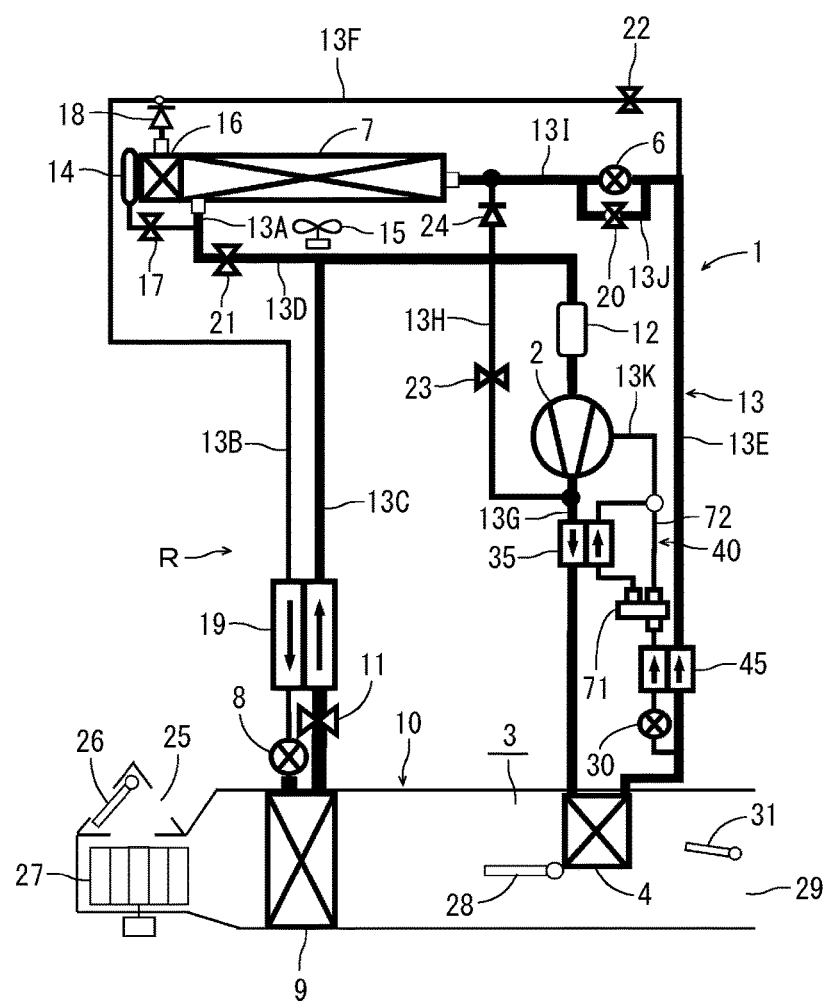
FIG. 16 is a constitutional view of a vehicle air-conditioning device of a further embodiment of the present invention.

Next, FIG. 16 shows a further constitutional view of the vehicle air-conditioning device 1 of the present invention. In this embodiment, an injection circuit 40 comprises a three-way valve 71 and a bypass pipe 72 (these components constitute flow path control means) on an outlet side of a radiator outlet side heat exchanger 45 in the injection circuit 40, in addition to the constitution of FIG. 14. One outlet of the three-way valve 71 is connected to the discharge side heat exchanger 35, and the other outlet thereof is connected to the bypass pipe 72 to connect the bypass pipe 72 to a refrigerant pipe 13K in parallel with a discharge side heat exchanger 35, so that the bypass pipe bypasses the discharge side heat exchanger 35.

Furthermore, the three-way valve 71 is controlled by a controller 32. When the controller 32 performs gas injection to a compressor 2, a refrigerant flowing out from the radiator outlet side heat exchanger 45 is usually allowed to flow through the bypass pipe 72 by the three-way valve 71. For example, when a heating qualification Qph of a radiator 4 mentioned above is lower than a demand heating qualification Qtgt, control is executed to allow the refrigerant flowing out from the radiator outlet side heat exchanger 45 to flow through the discharge side heat exchanger 35 by the three-way valve 71.

Figure 17:
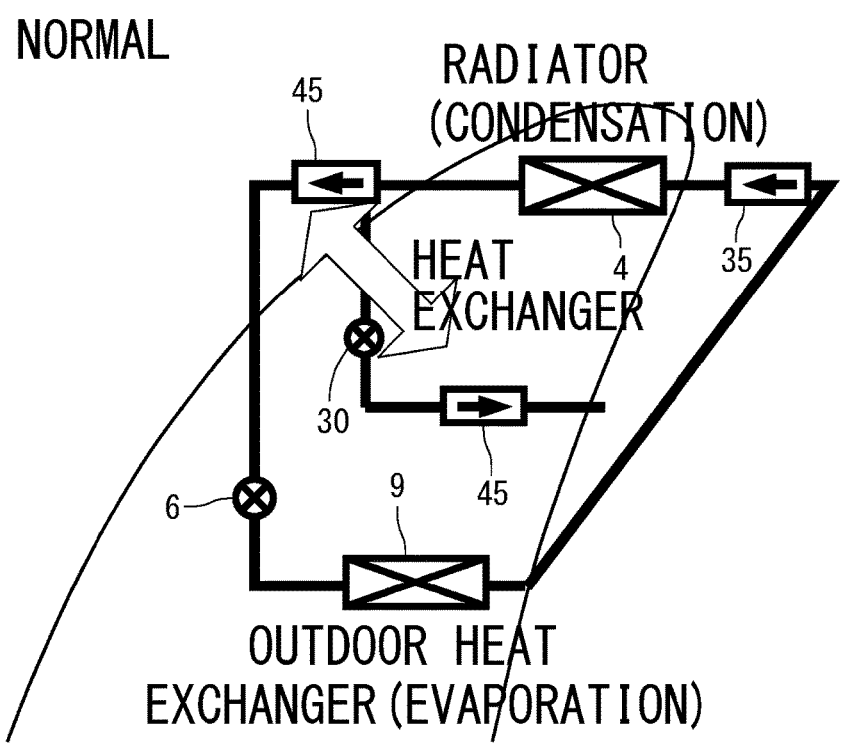
FIG. 17 is a p-h diagram of the vehicle air-conditioning device of FIG. 16.
Figure 18:
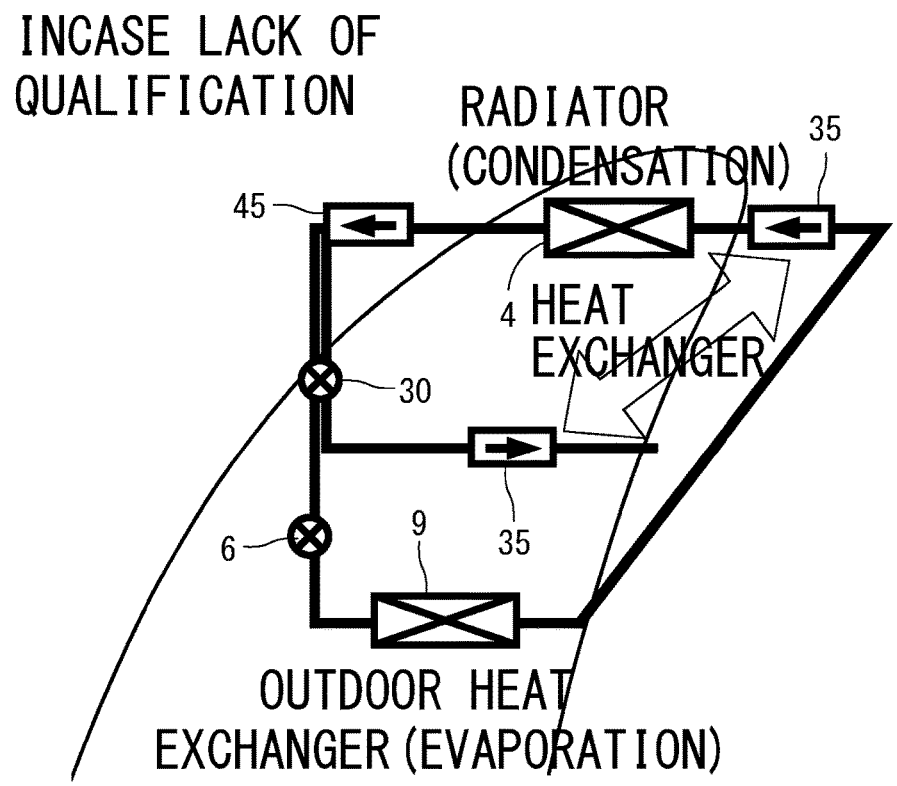
FIG. 18 is another p-h diagram of the vehicle air-conditioning device of FIG. 16.

FIG. 17 and FIG. 18 show p-h diagrams in this case. FIG. 17 shows a normal time, FIG. 18 shows a lack of the heating qualification, and a way to see the drawing is similar to that in FIG. 3. In consequence, inflow of the refrigerant into the discharge side heat exchanger 35 is controlled by using the three-way valve 71 and the bypass pipe 72 during gas injection, so that only in the case of the lack of the heating qualification, the heat exchange with the discharge side heat exchanger 35 can be utilized. Furthermore, it is possible to accurately eliminate the disadvantage that the enthalpy of the refrigerant flowing into the radiator 4 is lowered for the gas injection, and it is possible to improve an operation efficiency while improving the heating qualification.

(7-4) Further Example 4 of Injection Circuit

Figure 19:
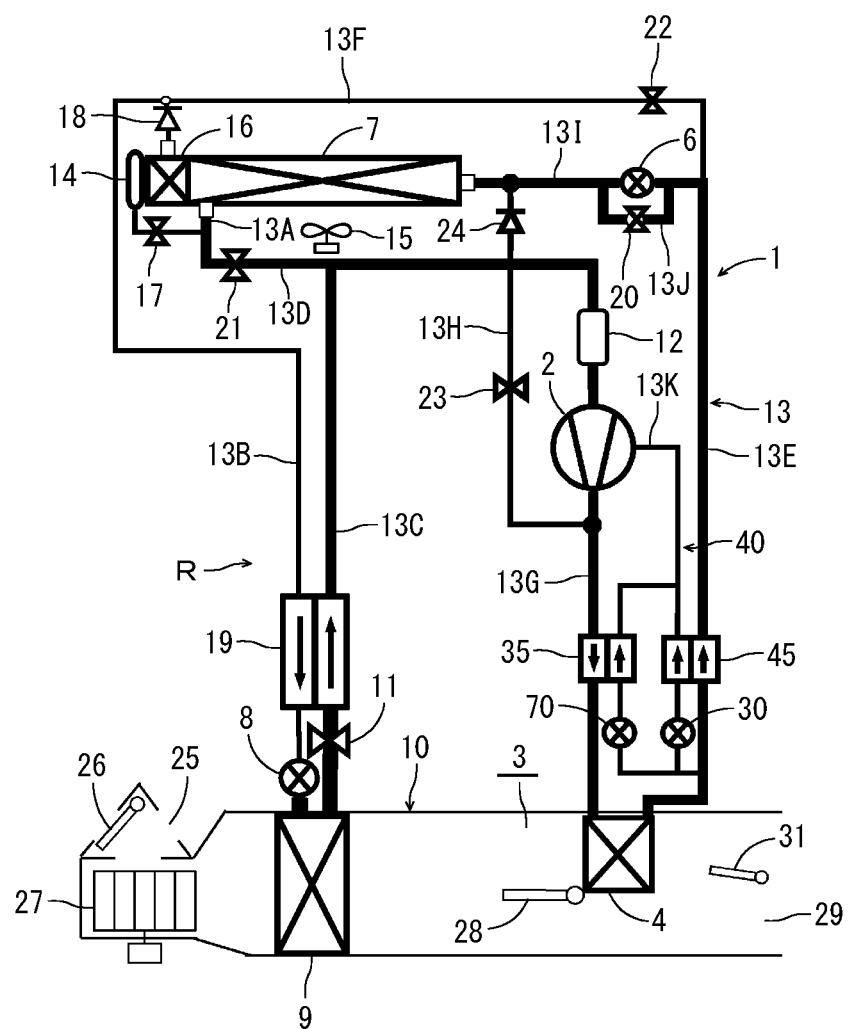
FIG. 19 is a constitutional view of a vehicle air-conditioning device of a further embodiment of the present invention.

Next, FIG. 19 shows a further constitutional view of the vehicle air-conditioning device 1 of the present invention. In the above constitution of FIG. 15, the radiator outlet side heat exchanger 45 and the discharge side heat exchanger 35 are connected in series in the injection circuit 40, but in this embodiment, a radiator outlet side heat exchanger 45 and a discharge side heat exchanger 35 are connected in parallel in an injection circuit 40, and injection refrigerants flowing into the respective heat exchangers are decompressed by injection expansion valves 30 and 70, respectively.

Furthermore, valve positions of the respective injection expansion valves 30 and 70 are controlled independently in accordance with refrigerant superheat degrees on outlet sides of the respective heat exchangers 45 and 35, and further, the respective expansion valves 30 and 70 are independently closed at shut off positions, so that as shown in FIG. 16, refrigerant inflows and flow rates into the respective heat exchangers 45 and 35 can precisely and independently be regulated in accordance with an excess or lack of qualification as in FIG. 16, and enhancement of the heating qualification and improvement of an operation efficiency can more effectively be performed.

(7-5) Further Example 5 of Injection Circuit

Figure 20:
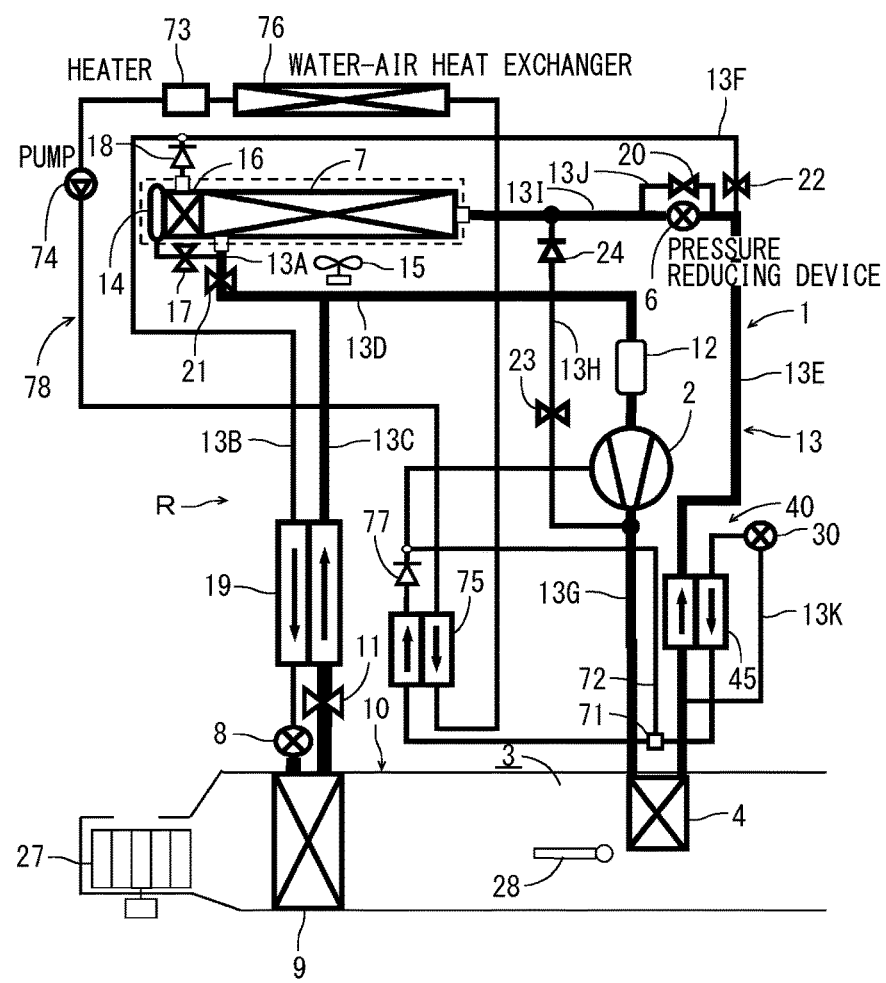
FIG. 20 is a constitutional view of a vehicle air-conditioning device of a further embodiment of the present invention.

Next, FIG. 20 shows a further constitutional view of the vehicle air-conditioning device 1 of the present invention. In this embodiment, a discharge side heat exchanger 35 is not disposed in an injection circuit 40 as in FIG. 16 mentioned above. In this example, the injection circuit 40 comprises a water-refrigerant heat exchanger 75 in place of the discharge side heat exchanger 35 in the constitution of FIG. 16. Furthermore, in this embodiment, a water circulation circuit 78 is disposed in the vehicle air-conditioning device 1.

The water circulation circuit 78 comprises an electric heater 73 constituting heating means, a pump 74 constituting circulating means, and a water-air heat exchanger 76 disposed on an air inflow side of an outdoor heat exchanger 7. In addition, the water-refrigerant heat exchanger 75 of the injection circuit 40 is connected to a downstream side of the three-way valve 71 similarly to the case of FIG. 16, and a bypass pipe 72 bypasses the water-refrigerant heat exchanger 75. It is to be noted that 77 is a check valve disposed in a refrigerant outlet of the water-refrigerant heat exchanger 75.

Furthermore, water flowing through the water circulation circuit 78 flows through the water-refrigerant heat exchanger 75, and performs heat exchange with an injection refrigerant. In addition, the electric heater 73 and the pump 74 are also controlled by a controller 32. The controller 32 heats the electric heater 73, and heats the water in the water circulation circuit 78. The heated water (warm water) is supplied to the water-refrigerant heat exchanger 75 by the pump 74, and the injection refrigerant is heated and evaporated.

The water flowing out from the water-refrigerant heat exchanger 75 next flows into the water-air heat exchanger 76 to radiate heat in outdoor air. This radiated heat is pumped up by the outdoor heat exchanger 7, which contributes to improvement of a heating qualification, and further, this heat radiation suppresses frost formation of the outdoor heat exchanger 7. It is to be noted that the water-air heat exchanger 76 may be disposed in an air flow passage 3 on an air downstream side of a radiator 4. When the water-air heat exchanger 76 is disposed in the air flow passage 3, the heat exchanger becomes a so-called heater core, and can complement heating in a vehicle interior.

Next, control of the injection circuit 40 by the controller 32 will be described with reference to FIG. 22. In this drawing, the abscissa indicates an outdoor temperature Tam, the ordinate indicates a heating qualification, a solid line (a diagonal line) indicating an HP qualification is a limit line of a heating qualification Qhp by the radiator 4 when the gas injection by the injection circuit 40 is not performed, and a broken line (a diagonal line) indicating an INJ qualification is a limit line of an injection heating qualification Qinj when heat exchange is performed in a radiator outlet side heat exchanger 45 to carry out gas injection.

Figure 21:
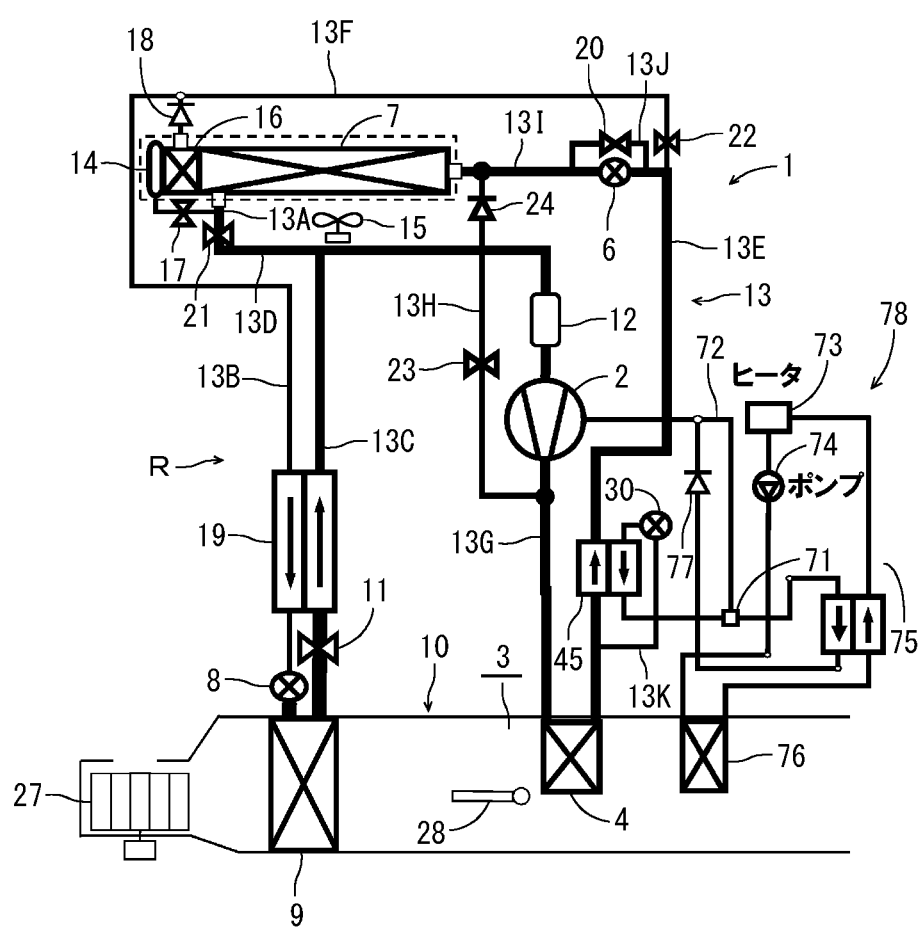
FIG. 21 is a constitutional view of a vehicle air-conditioning device of a still further embodiment of the present invention.
Figure 22:
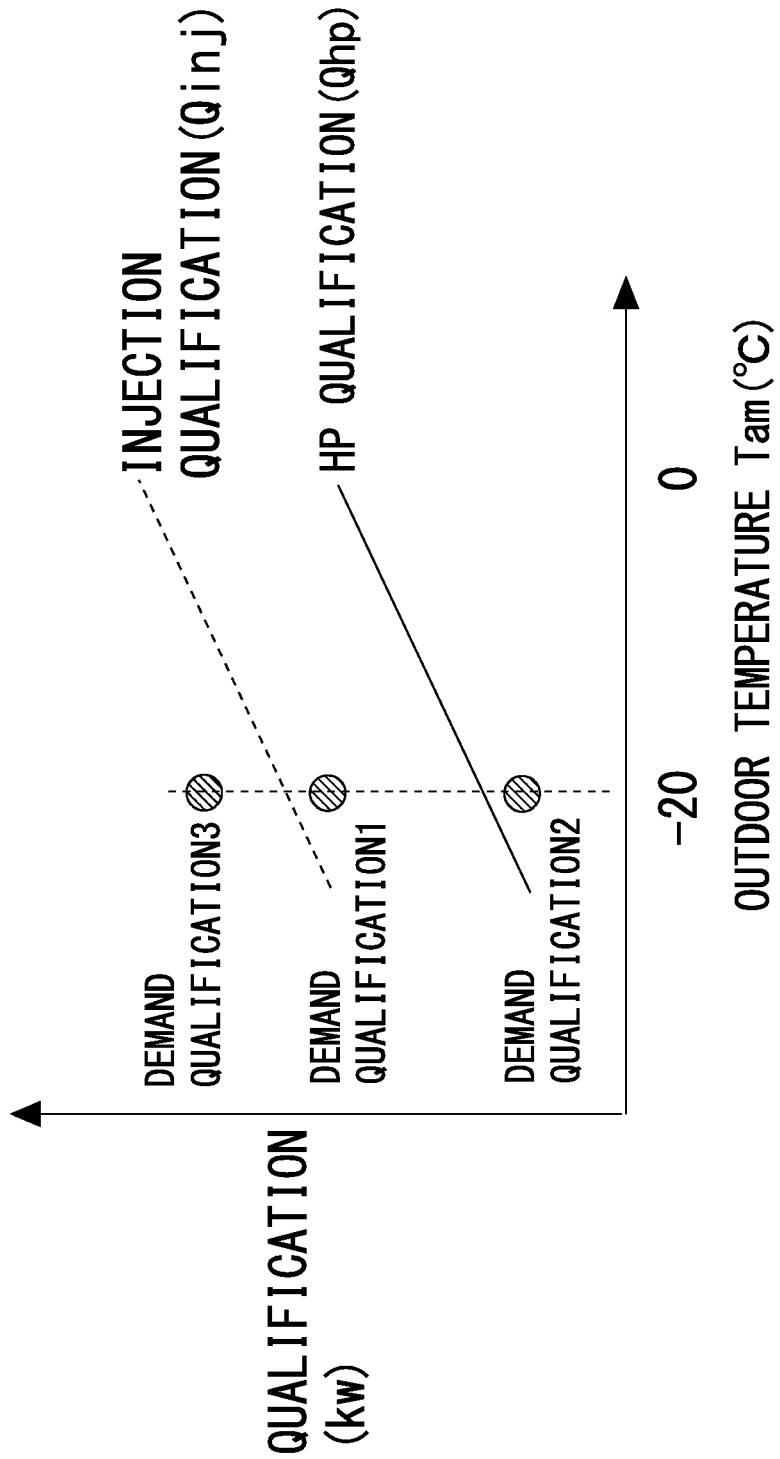
FIG. 22 is a diagram to explain gas injection control of the vehicle air-conditioning devices of FIG. 20 and FIG. 21 by the controller of FIG. 2.

Now, when the outdoor temperature Tam=−20° C. in FIG. 22 and when a demand heating qualification Qtgt is a demand qualification 2 lower than a solid line of the HP qualification, i.e., when the demand heating qualification Qtgt is satisfied by the heating qualification Qhp in a case where the gas injection is not performed, the controller 32 closes an injection expansion valve 30 of FIG. 20 and FIG. 21 at a shut off position and does not perform the gas injection.

When the demand heating qualification Qtgt is a demand qualification 1 which is larger than Qhp and smaller than the heating qualification Qinj by the gas injection in which the radiator outlet side heat exchanger 45 is used, the controller 32 opens the injection expansion valve 30 of FIG. 20 and FIG. 21 to perform the gas injection in which a decompressed refrigerant is allowed to flow through the radiator outlet side heat exchanger 45, and the refrigerant flowing out from the radiator outlet side heat exchanger 45 is allowed to flow through the bypass pipe 72 by a three-way valve 71 and returned to the middle of compression by the compressor 2. In consequence, the heating qualification enhances to satisfy the demand heating qualification Qtgt (the demand qualification 1).

On the other hand, when the demand qualification Qtgt is a demand qualification 3 which is larger than Qinj, the controller 32 energizes the electric heater 73 and the pump 74 of the water circulation circuit 78 to perform the gas injection in which the heated water (the warm water) is circulated in the water circulation circuit 78, the refrigerant flowing out from the radiator outlet side heat exchanger 45 is allowed to flow through the water-refrigerant heat exchanger 75 by the three-way valve 71, the heat exchange between the refrigerant and the water (the warm water) flowing through the water circulation circuit 78 is performed, and then the refrigerant is returned to the compressor 2.

It is to be noted that the controller 32 controls a valve position of the injection expansion valve 30 in these cases on the basis of a superheat degree of the refrigerant before flowing into the compressor 2 (a refrigerant pipe 13K on a downstream side from the bypass pipe 72). Furthermore, in the water-refrigerant heat exchanger 75, the refrigerant absorbs heat from the water (the warm water) to actively evaporate, and hence the controller 32 enlarges the valve position of the injection expansion valve 30 to increase a gas injection amount to be returned to the compressor 2.

Consequently, in the injection circuit 40, the three-way valve 71 and the bypass pipe 72 are further disposed to control the flow of the refrigerant to the respective heat exchangers 35, 45 and 75 in the injection circuit 40, and the controller 32 usually evaporates the refrigerant decompressed by the injection expansion valve 30 in the radiator outlet side heat exchanger 45 by the three-way valve 71. Furthermore, when the heating qualification by the heat radiation of the radiator 4 is insufficient, the water circulation circuit 78 is operated to evaporate the refrigerant in the water-refrigerant heat exchanger 75, and the refrigerant flow rate in the injection circuit 40 is increased by the injection expansion valve 30, so that only in the case of the lack of the heating qualification, the heated water in the water circulation circuit 78 of the compressor 2 can be utilized. In consequence, it is possible to eliminate the disadvantage that the enthalpy of the refrigerant flowing into the radiator 4 is unnecessarily lowered for the gas injection, and to improve an operation efficiency.

(8) Frost Formation Suppressing of Outdoor Heat Exchanger by Injection Circuit

Next, frost formation suppressing control of the outdoor heat exchanger 7 by the controller 32 will be described. In the heating mode, as described above, the outdoor heat exchanger 7 absorbs heat from the outdoor air to have a low temperature, and hence water in the outdoor air forms frost to adhere to the outdoor heat exchanger 7. When this formed frost grows, heat exchange between the outdoor heat exchanger 7 and the passed outdoor air is noticeably disturbed, and an air conditioning performance worsens. When the formed frost grows in the outdoor heat exchanger 7, the controller 32 opens the solenoid valve 23 mentioned above to execute a defrost mode of the outdoor heat exchanger 7, but prior to the execution, the frost formation to the outdoor heat exchanger 7 is suppressed by using the injection circuit 40.

The injection circuit 40 distributes a part of the refrigerant flowing out from the radiator 4, performs the heat exchange between the refrigerant and the discharge side heat exchanger 35 to gasify the refrigerant, and then returns the refrigerant to the middle of compression by the compressor 2 in FIG. 1, and hence by this gas injection, the discharge pressure of the compressor 2 (a high pressure-side pressure) rises. Therefore, the refrigerant pressure of the outdoor heat exchanger 7 which is a low pressure-side pressure of the refrigerant circuit R also rises, and hence the frost formation is suppressed.

(8-1) Frost Formation Estimation of Outdoor Heat Exchanger

Specifically, the controller 32 first estimates a frost formation condition of the outdoor heat exchanger 7. Next, an estimation example of the frost formation condition of the outdoor heat exchanger 7 will be described with reference to FIG. 23. The controller 32 allows the estimation of the frost formation condition of the outdoor heat exchanger 7, when (i) of the following frost formation condition estimation allowing conditions is first established and one of (ii) to (iv) is established.

[Frost Formation Condition Estimation Allowing Conditions]

(i) An operation mode is the heating mode.

(ii) The high pressure converges at a target value. Specifically, an example of this condition is a condition that there is continued for a predetermined time t1 (sec) a state where an absolute value of a difference (PCO−PCI) between the target radiator pressure PCO and the radiator pressure PCI is a predetermined value A or less.

(iii) A predetermined time t2 (sec) passes after the mode shifts to the heating mode.

(iv) A velocity variance is a predetermined value or less (an acceleration/deceleration speed of the vehicle is the predetermined value or less). The acceleration/deceleration speed of the vehicle is, for example, a difference (VSP−VSPz) between the current velocity VSP and a velocity VSPz of one second before.

The above conditions (ii) and (iii) are conditions to remove wrong estimation occurring in a transitional period of an operating status. Furthermore, also when the velocity noticeably varies, the wrong estimation occurs, and hence the above condition (iv) is added.

When the above frost formation condition estimation allowing conditions are established to allow the frost formation condition estimation, the controller 32 estimates the frost formation condition of the outdoor heat exchanger 7 on the basis of a current refrigerant evaporation temperature TXO of the outdoor heat exchanger 7 which is obtained from the outdoor heat exchanger pressure sensor 56 and a refrigerant evaporation temperature TXObase of the outdoor heat exchanger 7 during non-frost formation when the outdoor air is a low humidity environment and the frost is not formed in the outdoor heat exchanger 7. The controller 32 in this case determines the refrigerant evaporation temperature TXObase of the outdoor heat exchanger 7 during the non-frost formation by use of the following equation (IV).

$$\text{TXObase} = f(\text{Tam}, \text{NC}, \text{BLV}, \text{VSP}) = k1 \times \text{Tam} + k2 \times \text{NC} + k3 \times \text{BLV} + k4 \times \text{VSP} \quad \text{(IV)}$$

Here, as to parameters of Equation (IV), Tam is an outdoor temperature obtained from the outdoor temperature sensor 33, NC is a revolution number of the compressor 2, BLV is a blower voltage of the indoor blower 27, VSP is a velocity obtained from the velocity sensor 52, and k1 to k4 are coefficients which are obtained beforehand by experiments.

The above outdoor temperature Tam is an index indicating a suction air temperature of the outdoor heat exchanger 7, and there is a tendency that the lower the outdoor temperature Tam (the suction air temperature of the outdoor heat exchanger 7) is, the lower the temperature TXObase becomes. Therefore, the coefficient k1 is a positive value. It is to be noted that the index indicating the suction air temperature of the outdoor heat exchanger 7 is not limited to the outdoor temperature Tam.

In addition, the above revolution number NC of the compressor 2 is an index indicating the refrigerant flow rate in the refrigerant circuit R, and there is a tendency that the higher the revolution number NC is (the larger the refrigerant flow rate is), the lower the temperature TXObase becomes. Therefore, the coefficient k2 is a negative value.

In addition, the above blower voltage BLV is an index indicating a passing air volume of the radiator 4, and there is a tendency that the higher the blower voltage BLV is (the larger a passing air volume of the radiator 4 is), the lower the temperature TXObase becomes. Therefore, the coefficient k3 is a negative value. It is to be noted that the index indicating the passing air volume of the radiator 4 is not limited to this example, and may be a blower air volume of the indoor blower 27 or an opening SW of the air mix damper 28.

In addition, the above velocity VSP is an index indicating a passing air speed of the outdoor heat exchanger 7, and there is a tendency that the lower the velocity VSP is (the lower the passing air speed of the outdoor heat exchanger 7 is), the lower the temperature TXObase becomes. Therefore, the coefficient k4 is a positive value. It is to be noted that the index indicating the passing air speed of the outdoor heat exchanger 7 is not limited to this example, and may be a voltage of the outdoor blower 15.

It is to be noted that in the embodiment, as the parameters of Equation (IV), the outdoor temperature Tam, the revolution number NC of the compressor 2, the blower voltage BLV of the indoor blower 27 and the velocity VSP are used, but a load of the vehicle air-conditioning device 1 may be added as a parameter to these parameters. It is considered that examples of an index indicating this load include the target outlet temperature TAO, the revolution number NC of the compressor 2, the blower air volume of the indoor blower 27, an inlet air temperature of the radiator 4, and the radiator temperature Tci of the radiator 4, and there is a tendency that the larger the load is, the lower the temperature PXObase becomes. Furthermore, aging deterioration of the vehicle (the number of driving years or the number of driving times) may be added to the parameters. In addition, the parameters of Equation (IV) are not limited to all of the above parameters, and one of the parameters or any combination of the parameters may be used.

Next, the controller 32 calculates a difference $\Delta TXO$ ($\Delta TXO=TXObase-TXO$) between the refrigerant evaporation temperature TXObase during the non-frost formation which is obtained by substituting respective current parameter values into Equation (IV) and the current refrigerant evaporation temperature TXO, and the controller judges that the frost is to be formed in the outdoor heat exchanger 7 when there is continued for a predetermined time t1 (sec) or more a state where the refrigerant evaporation temperature TXO is lower than the refrigerant evaporation temperature TXObase during the non-frost formation and the difference $\Delta TXO$ is a frost formation detecting threshold 1 or more.

Figure 23:
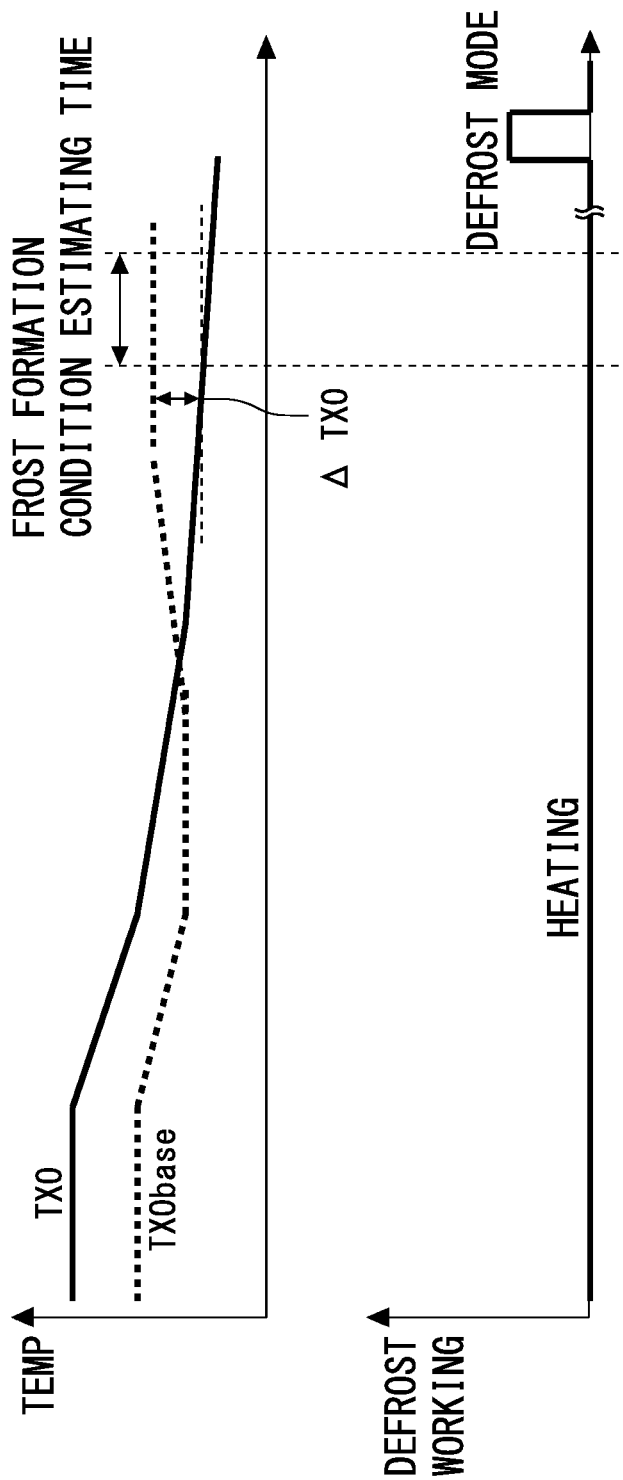
FIG. 23 is a timing chart to explain a frost formation condition estimating operation of an outdoor heat exchanger by the controller of FIG. 2.

In FIG. 23, a solid line shows a change of the refrigerant evaporation temperature TXO of the outdoor heat exchanger 7, and a broken line shows a change of the refrigerant evaporation temperature TXObase during the non-frost formation. In the beginning of an operation start, the refrigerant evaporation temperature TXO of the outdoor heat exchanger 7 is high and is in excess of the refrigerant evaporation temperature TXObase during the non-frost formation. The interior temperature is raised accompanying progress of the heating mode, and the load of the vehicle air-conditioning device 1 lowers, and hence the abovementioned refrigerant flow rate or the passing air volume of the radiator 4 also lowers, and TXObase (the broken line of FIG. 23) calculated in accordance with Equation (IV) rises. On the other hand, when the frost formation starts to occur in the outdoor heat exchanger 7, a heat exchange performance with the outdoor air worsens little by little, so that the refrigerant evaporation temperature TXO (the solid line) gradually drops and then falls below TXObase. Then, the drop of the refrigerant evaporation temperature TXO further proceeds, and the difference $\Delta TXO$ (TXObase−TXO) reaches the frost formation detecting threshold 1 or more. Furthermore, when this state is continued for the predetermined time t1 or more, the controller 32 judges a frost formation estimating first stage.

(8-2) Frost Formation Suppressing Operation to Outdoor Heat Exchanger

When it is judged that the frost formation condition of the outdoor heat exchanger 7 is the frost formation condition estimating first stage, the controller 32 judges that there is a high risk that the frost formation occurs in the outdoor heat exchanger 7 from now on, and executes a predetermined frost formation suppressing operation. It is considered that this frost formation suppressing operation includes the lowering of the revolution number of the compressor 2, the lowering of the passing air volume of the radiator 4 by the indoor blower 27, the raising of the refrigerant subcool degree of the radiator 4 by the reduction of the valve position of the outdoor expansion valve 6 and the like, or any combination of these operations. In consequence, the refrigerant evaporation pressure of the outdoor heat exchanger 7 which is the low pressure-side pressure rises, and hence the frost formation to the outdoor heat exchanger 7 is suppressed.

(8-3) Frost Formation Suppressing by Injection Circuit

When the frost formation to the outdoor heat exchanger 7 proceeds even by such a frost formation suppressing operation, the difference $\Delta TXO$(TXObase−TXO) is the frost formation detecting threshold 2 or more which is larger than the frost formation detecting threshold 1 and this state is continued for a predetermined time t2 or more, the controller 32 judges a frost formation condition estimating second stage. When it is judged that the frost formation condition of the outdoor heat exchanger 7 is the frost formation condition estimating second stage, the controller 32 judges that the frost formation to the outdoor heat exchanger 7 is presumed, and opens the injection expansion valve 30 to execute the gas injection to the compressor 2 by the injection circuit 40. The subsequent control of the injection amount by the valve position control of the injection expansion valve 30 is similar to the abovementioned control.

By this gas injection, the low pressure-side pressure rises as described above, and hence the frost formation to the outdoor heat exchanger 7 is suppressed. Additionally, by the gas injection, the heating qualification in the vehicle interior improves.

It is to be noted that when the water circulation circuit 78 similar to that shown in FIG. 21 is also disposed in the constitutional view of FIG. 1 and when the heating qualification Qhp is lower than the demand heating qualification Qtgt even by the gas injection, the controller 32 operates the water circulation circuit 78, complements the heating by the water-air heat exchanger 76, and maintains the heating qualification in the vehicle interior.

(8-4) Defrost Mode of Outdoor Heat Exchanger

When the frost formation to the outdoor heat exchanger 7 proceeds even by this gas injection of the injection circuit 40, the difference $\Delta TXO$(TXObase−TXO) is the frost formation detecting threshold 3 or more which is larger than the frost formation detecting threshold 2 and this state is continued for a predetermined time t3 or more, the controller 32 judges a frost formation condition estimating final stage. When it is judged that the frost formation condition of the outdoor heat exchanger 7 is the frost formation condition estimating final stage, the controller 32 shifts to the defrost mode. In this defrost mode, the controller 32 opens the solenoid valve 23 and the solenoid valve 21 and closes the solenoid valve 22 and the solenoid valve 17 to operate the compressor 2. In consequence, the high-temperature high-pressure gas refrigerant (the hot gas) discharged from the compressor 2 flows through the solenoid valve 23, the refrigerant pipe 13H, the check valve 24 and the refrigerant pipe 13I to flow directly into the outdoor heat exchanger 7. In consequence, the outdoor heat exchanger 7 is heated, and hence the formed frost is melted and removed.

Figure 24:
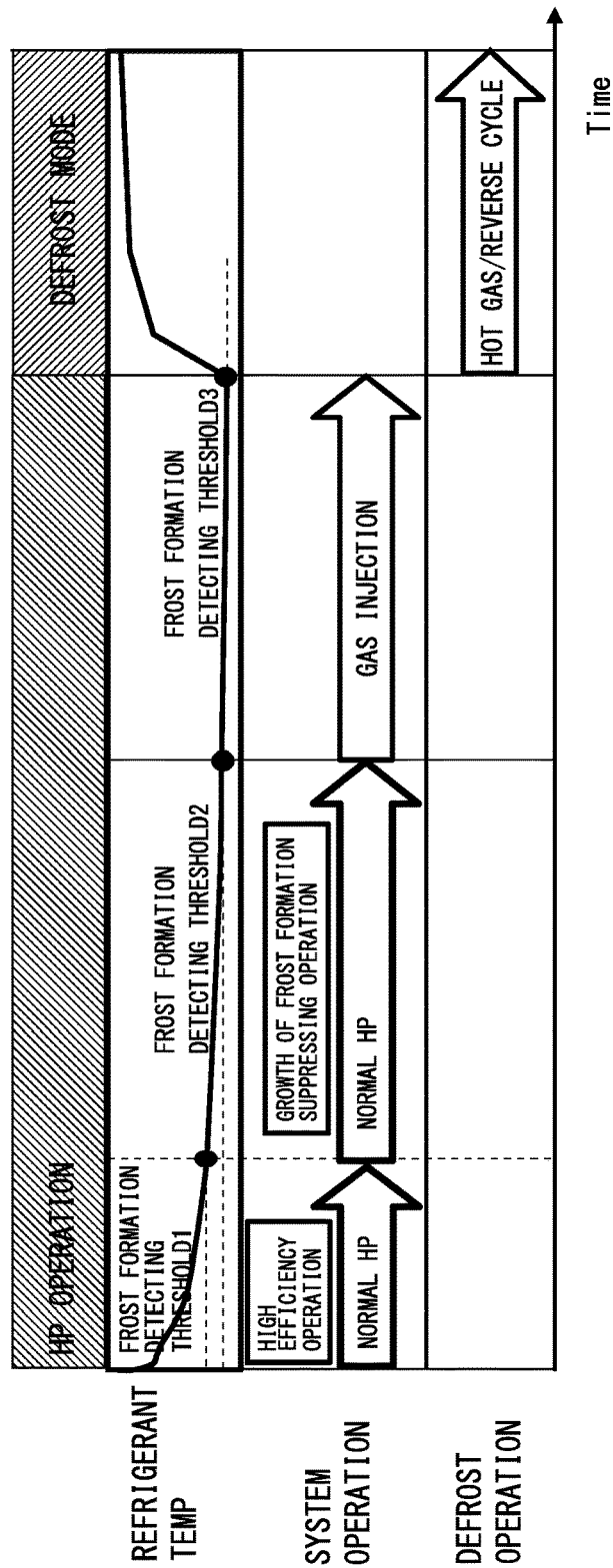
FIG. 24 is a timing chart to explain an operation from estimation of a frost formation condition of the outdoor heat exchanger by the controller of FIG. 2 to a defrost mode.

The refrigerant flowing out from the outdoor heat exchanger 7 flows from the refrigerant pipe 13A through the solenoid valve 21 to enter the refrigerant pipe 13D, and is sucked through the refrigerant pipe 13B into the compressor 2. Furthermore, when a predetermined time passes from the start of the defrost mode, the controller 32 ends the defrost mode to return to the heating mode. A timing chart of FIG. 24 shows such a state from the frost formation condition estimating to the defrost mode.

It is to be noted that in the above embodiment, the refrigerant evaporation temperature TXO of the outdoor heat exchanger 7 is employed to estimate the frost formation condition, but the present invention is not limited to this embodiment, and the frost formation condition of the outdoor heat exchanger 7 may be estimated on the basis of a current refrigerant evaporation pressure PXO of the outdoor heat exchanger 7 which is obtained from the outdoor heat exchanger temperature sensor 54, and a refrigerant evaporation pressure PXObase of the outdoor heat exchanger 7 during the non-frost formation when the outdoor air is a low humidity environment and the frost is not formed in the outdoor heat exchanger 7.

Furthermore, frost formation condition estimating means is not limited to these examples, and the controller 32 may estimate the frost formation condition of the outdoor heat exchanger 7 on the basis of a zero point temperature and the refrigerant evaporation temperature of the outdoor heat exchanger 7 which are detected by the outdoor temperature sensor 33 and the outdoor humidity sensor 34.

When the frost formation condition of the outdoor heat exchanger 7 is estimated and the frost formation is presumed in this manner, the injection circuit 40 performs the gas injection to the compressor 2, so that the frost formation to the outdoor heat exchanger 7 can be suppressed. In consequence, it is possible to avoid the worsening of the air condition in the vehicle interior due to the defrosting and achieve the improvement of the heating qualification by the radiator 4.

Additionally, in the stage before the injection circuit 40 is operated, the controller 32 executes the operation to suppress the frost formation of the outdoor heat exchanger 7, and hence the defrosting can be avoided as much as possible, and the worsening of the air condition in the vehicle interior can effectively be avoided.

It is to be noted that in the embodiment, the present invention is applied to the vehicle air-conditioning device 1 which changes and executes the respective operation modes of the heating mode, the dehumidifying and heating mode, the dehumidifying and cooling mode, and the cooling mode, but the present invention is not limited to the embodiment, and the present invention is also effective for a vehicle air-conditioning device which only performs the heating mode.

Additionally, in the embodiment, the high-temperature refrigerant gas is allowed to flow through the outdoor heat exchanger 7, thereby performing the defrosting, but the defrosting means is not limited to the embodiment, and the present invention is also effective for a vehicle air-conditioning device which performs the defrosting by reversing the flow of the refrigerant, by an electric heater or the like, or simply by passing the air.

Furthermore, the constitution of the refrigerant circuit R and the respective numeric values described in the above embodiments are not limited, and are, needless to say, changeable without departing from the gist of the present invention.

DESCRIPTION OF REFERENCE NUMERALS

1 vehicle air-conditioning device
2 compressor
3 air flow passage
4 radiator
6 outdoor expansion valve
7 outdoor heat exchanger
8 indoor expansion valve
9 heat absorber
11 evaporation capability control valve
17, 20, 21 and 22 solenoid valve
23 solenoid valve (defrosting means)
26 suction changing damper
27 indoor blower (a blower fan)
28 air mix damper
32 controller (control means)
30 and 70 expansion valve
40 injection circuit
35 discharge side heat exchanger
45 radiator outlet side heat exchanger
75 water-refrigerant heat exchanger
76 water-air heat exchanger
78 water circulation circuit
R refrigerant circuit

The invention claimed is:

1. A vehicle air-conditioning device comprising:
a compressor which compresses a refrigerant;
an air flow passage through which air to be supplied into a vehicle interior flows;
a radiator disposed in the air flow passage to let the refrigerant radiate heat;
a heat absorber disposed in the air flow passage to let the refrigerant absorb heat;
an outdoor heat exchanger disposed outside the vehicle interior to let the refrigerant radiate or absorb heat; and
control means,
at least the control means being configured to execute a heating mode in which the refrigerant discharged from the compressor radiates heat in the radiator and the refrigerant by which heat has been radiated is decompressed and then absorbs heat in the outdoor heat exchanger,
the vehicle air-conditioning device comprising:
an injection circuit which distributes a part of the refrigerant flowing out from the radiator to return the refrigerant to the middle of compression by the compressor; and
a water circulation circuit in which water heated by heating means is circulated by circulating means,
wherein the injection circuit has pressure reducing means, and a water-refrigerant heat exchanger which performs heat exchange between the refrigerant decompressed by the pressure reducing means and the water flowing in the water circulation circuit,
wherein the control means compares a demand heating qualification Qtgt which is a demanded radiator heating qualification with a heating qualification Qhp generated by the radiator, and allows the refrigerant to flow through the injection circuit by the pressure reducing means when the heating qualification Qhp is lower than the demand heating qualification Qtgt,
wherein the control means calculates the demand heating qualification Qtgt on the basis of one of indexes indicating a temperature of the air flowing into the radiator, a temperature of the air flowing out from the radiator, and a volume of the air passing the radiator, or any combination of these indexes, and indexes indicating specific heat of the air flowing into the radiator and a density of the air, and
the control means calculates the heating qualification Qhp on the basis of one of indexes indicating an outdoor temperature, the refrigerant flow rate, an air volume in the air flow passage, a velocity, a temperature of the heat absorber, a revolution number of the compressor, a refrigerant pressure of an outlet of the radiator, a refrigerant temperature of the radiator outlet, a refrigerant pressure of an inlet of the radiator, and a refrigerant temperature of the radiator inlet, or any combination of these indexes.

2. The vehicle air-conditioning device according to claim 1, wherein the control means controls an amount of the refrigerant to be returned from the injection circuit to the compressor by the pressure reducing means, on the basis of one of a difference between the demand heating qualification Qtgt which is the demanded radiator heating qualification and the heating qualification Qhp generated by the radiator, a difference between the target radiator temperature and a temperature of the radiator, a difference between a target radiator pressure and a pressure of the radiator, and a target outlet temperature to the vehicle interior, or any combination thereof.

3. The vehicle air-conditioning device according to claim 2, wherein the water circulation circuit has a water-air heat exchanger disposed on an air inflow side of the outdoor heat exchanger or in the air flow passage.

4. The vehicle air-conditioning device according to claim 1, wherein the water circulation circuit has a water-air heat exchanger disposed on an air inflow side of the outdoor heat exchanger or in the air flow passage.

5. A vehicle air-conditioning device comprising:
a compressor which compresses a refrigerant;
an air flow passage through which air to be supplied into a vehicle interior flows;
a radiator disposed in the air flow passage to let the refrigerant radiate heat;
a heat absorber disposed in the air flow passage to let the refrigerant absorb heat;
an outdoor heat exchanger disposed outside the vehicle interior to let the refrigerant radiate or absorb heat; and
control means,
at least the control means being configured to execute a heating mode in which the refrigerant discharged from the compressor radiates heat in the radiator and the refrigerant by which heat has been radiated is decompressed and then absorbs heat in the outdoor heat exchanger,
the vehicle air-conditioning device comprising:
an injection circuit which distributes a part of the refrigerant flowing out from the radiator to return the refrigerant to the middle of compression by the compressor; and
a water circulation circuit in which water heated by heating means is circulated by circulating means,
wherein the injection circuit has pressure reducing means, and a water-refrigerant heat exchanger which performs heat exchange between the refrigerant decompressed by the pressure reducing means and the water flowing in the water circulation circuit,
wherein the control means compares a demand heating qualification Qtgt which is a demanded radiator heating qualification with a heating qualification Qhp generated by the radiator, and allows the refrigerant to flow through the injection circuit by the pressure reducing means when the heating qualification Qhp is lower than the demand heating qualification Qtgt,
wherein the control means controls an amount of the refrigerant to be returned from the injection circuit to the compressor by the pressure reducing means, on the basis of one of a difference between the demand heating qualification Qtgt which is the demanded radiator heating qualification and the heating qualification Qhp generated by the radiator, a difference between the target radiator temperature and a temperature of the radiator, a difference between a target radiator pressure and a pressure of the radiator, and a target outlet temperature to the vehicle interior, or any combination thereof.

6. The vehicle air-conditioning device according to claim 5, wherein the water circulation circuit has a water-air heat exchanger disposed on an air inflow side of the outdoor heat exchanger or in the air flow passage.

* * * * *